US010291404B2

(12) United States Patent
Kamijoh et al.

(10) Patent No.: US 10,291,404 B2
(45) Date of Patent: May 14, 2019

(54) SUPPLIES OF DEFICIENCY OF A KEY IN INFORMATION ON A SET OF KEYS

(71) Applicant: INTERNATIONAL BUSINESS MACHINES CORPORATION, Armonk, NY (US)

(72) Inventors: Kohichi Kamijoh, Tokyo (JP); Seiji Munetoh, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 15/453,017

(22) Filed: Mar. 8, 2017

(65) Prior Publication Data

US 2018/0262332 A1 Sep. 13, 2018

(51) Int. Cl.
*H04L 9/08* (2006.01)

(52) U.S. Cl.
CPC ............ *H04L 9/0894* (2013.01); *H04L 9/083* (2013.01)

(58) Field of Classification Search
CPC ..... H04L 9/0816; H04L 9/0819; H04L 9/083; H04L 9/0836; H04L 9/0894; H04L 9/3265; H04L 2209/601
See application file for complete search history.

(56) References Cited

U.S. PATENT DOCUMENTS 6,735,312 B1 * 5/2004 Abdalla ................. H04N 7/165 348/E7.056
7,949,135 B2 * 5/2011 Lindholm ............ H04L 9/0836 380/277
9,712,321 B2 * 7/2017 Jin .......................... G09C 5/00
2012/0183136 A1 7/2012 Kim et al.
2014/0064490 A1 3/2014 Wang et al.
2014/0195809 A1 7/2014 Solow et al.

FOREIGN PATENT DOCUMENTS

JP 5043408 B2 7/2012

OTHER PUBLICATIONS

Naor et al., Revocation and Tracing Schemes for Stateless Receivers, 2001.*
Bhattacherjee et al., Tree Based Symmetric Key Broadcast Encryption, 2013.*
Yao, L. et al., "Tree-Based Multicast Key Management in Ubiquitous Computing Environment" International Journal of Ad Hoc and Ubiquitous Computing (Jul. 2011) pp. 1-2 vol. 8, issue 1/2, abstract.
Yao, L. et al., "Tree-Based Multicast Key Management in Ubiquitous Computing Environment" International Journal of Ad Hoc and Ubiquitous Computing (Jul. 2011) pp. 27-35, vol. 8, issue 1/2.

* cited by examiner

*Primary Examiner* — Minh Dinh
(74) *Attorney, Agent, or Firm* — Tutunjian & Bitetto, P.C.; Vazken Alexanian

(57) ABSTRACT

Methods for supplying deficiency of a key in a set of keys stored in devices includes receiving information (key values) on the keys from each device. Each key is assigned to a node or pair of nodes in a tree structure(s). If a position of a key in the tree structure in a first set of keys is stored in a first device with its value and corresponds to a position of a key in the tree structure in a second set of keys stored in a second device with its value, the first device and the second device are grouped together. Where there is a missing key in the first set of keys, a key corresponding to the missing key from the second set of keys is found, or a key common in the first set of keys and the second set of keys is found.

2 Claims, 19 Drawing Sheets

SUPPLIES OF DEFICIENCY OF A KEY IN INFORMATION ON A SET OF KEYS

BACKGROUND

Technical Field

This invention relates to a method, device and computer program for supplying deficiency of a key in information on a set of keys stored in a device.

Related Art

The miniaturization of a semiconductor such as 100 nm ×100 nm realizes an ultra-small computer for an affordable price. Such semiconductor may be implemented as, for example, but not limited to, Internet of Things (hereinafter referred to as "IoT") devices, card devices, content presentation devices and content player devices.

In such semiconductor, a set of keys may be used for decrypting an encrypted content or encrypted key, for encrypting a content or key, or for authenticating the device or a user associated with the device.

SUMMARY

According to one aspect of the present invention, an embodiment of the present invention provides a method for supplying deficiency of a key in information on a set of keys stored in a device. The method comprises: receiving a set of keys from each of a plurality of devices, where the information on the set of keys may comprise a plurality of key values, each key in the set of keys being assigned to a node among nodes in a tree structure or being assigned to a pair of nodes among nodes in one or more tree structures, each key in the plurality of keys being assigned to a node, and the set of keys may have one or more missing keys; in a case where a position of a key or each key in the tree structure in a first set of keys stored in a first device among the plurality of devices and a value of this key correspond to a position of a key or each key in the tree structure in a second set of keys stored in a second device among the plurality of devices and a value of this key, respectively, grouping the first device and the second device together; and in a case where there is a missing key in the first set of keys, finding a key corresponding to the missing key from the second set of keys or finding a key common in the first set of keys and the second set of keys.

According to another aspect of the present invention, a device comprising a processor and a memory storing a program of instructions executable by the processor to perform one or more methods described herein may be provided.

According to another aspect of the present invention, a computer program product comprising a computer readable storage medium storing a program of instructions executable by a device to perform one or more methods described herein also may be provided.

BRIEF DESCRIPTION OF THE DRAWINGS

The disclosure will provide details in the following description of preferred embodiments with reference to the following figures.

DETAILED DESCRIPTION

Figure 1A:
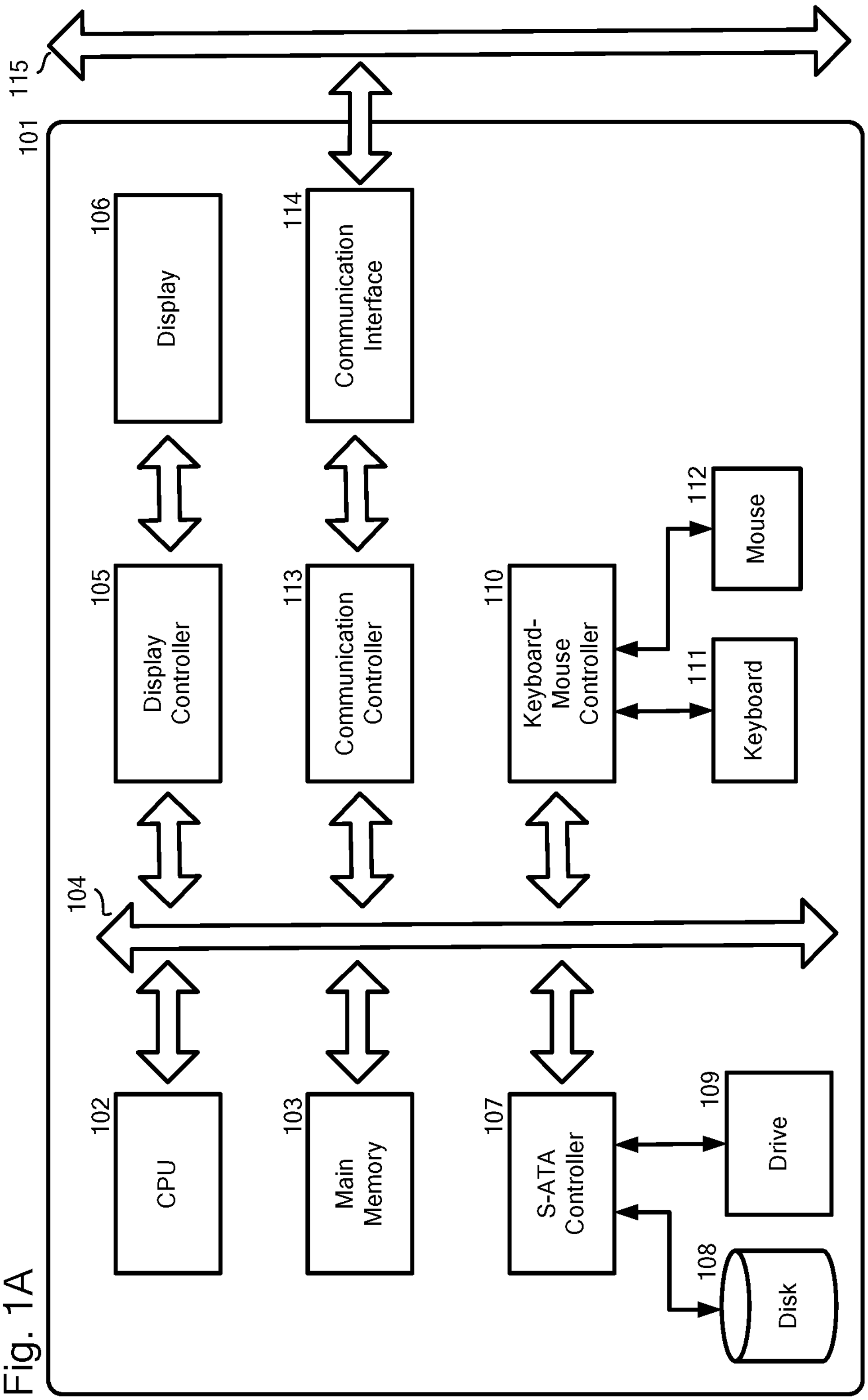
FIG. 1A illustrates an exemplified basic block diagram of a computer hardware, such as a hardware for a key management system, a system used in a chip manufacture, a service provider, a local server or a device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To define more clearly the terms used herein, the following exemplified definitions are provided, but the meaning of the terms should be interpreted broadly as known to the technical field to which the present invention relates.

The term, "device", refers to any device in which a set of keys may be stored.

The device may be, for example, but not limited to, IoT (Internet of Things) devices, card devices, registers, automated teller machines, content provider devices, content presentation devices and content player devices. The IoT devices may include, for example, but are not limited to a variety of sensors such as a temperature sensor, humidity sensor, illuminance sensor, human sensor, or acceleration sensor, thermostats, light bulbs, door locks, refrigerators, cars, implants for RFID and pacemakers. The card devices may include, for example, but are not limited to, smart cards such as transportation system integrated circuit (IC) cards, credit cards, debit cards, bank cards, health insurance cards, public card phones, and B-CAS cards. The registers may include, for example, but are not limited to, point of service (POS) terminals. The automated teller machines (ATM) may include, for example, but are not limited to ATMs or multi-service machines. The content provider devices may include, for example, but are not limited to, local content provider hubs. The content presentation devices may include, for example, but are not limited to a projector, a video monitor, televisions or computers, speakers. The content player devices may include, for example, but are not limited to, DVD or BD players, a set top box, or recorders, and televisions or computers in each of which a DVD or BD player or recorder is embedded.

The device may include a semiconductor or chip in which a set of keys is stored. The set of keys may be stored, for example, but are not limited to at the same time when or after the chip is manufactured or at the same time when or after the device including the chip is manufactured.

An exemplified basic block diagram of the device will be explained below by referring to FIG. 1A or 1B mentioned below.

According to an embodiment of the present invention, a key management system, a system used in a chip manufacture, a service provider, a local server and a device may be provided in order to implement an embodiment of the present invention.

With reference now to FIG. 1A, FIG. 1A illustrates an exemplified basic block diagram of a computer hardware used in an embodiment of the present invention.

The computer hardware may be for the key management system, the system used in the chip manufacture, the service provider, the local server or the device, all of which may be used in an embodiment of the present invention.

A system (101) may be, for example, but is not limited to a desktop, a laptop, a notebook, a tablet or a server computer. The server computer may be, for example, but is not limited to a workstation, a rack-mount type server, a blade type server, or a mainframe server and may run, for example, a hypervisor for creating and running one or more virtual machines. The system (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation™; the Core i™ series, the Core 2™ series, the Atom™ series, the Xeon™ series, the Pentium® series, or the Celeron® series of Intel Corporation™; or the Phenom™ series, the Athlon™ series, the Turion™ series, or Sempron™ of Advanced Micro Devices™, Inc. ("Power" is registered trademark of International Business Machines Corporation™ in the United States, other countries, or both; "Core i", "Core 2", "Atom", and "Xeon" are trademarks, and "Pentium" and "Celeron" are registered trademarks of Intel Corporation™ in the United States, other countries, or both; "Phenom", "Athlon", "Turion", and "Sempron" are trademarks of Advanced Micro Devices™, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. A disk (108) such as a hard disk or a solid state drive, SSD, and a drive (109) such as a CD (compact dick), a DVD (digital video disk), or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft Corporation™ in the United States, other countries, or both; "UNIX" is a registered trademark of the Open Group in the United States, other countries, or both; "Mac OS" is a registered trademark of Apple™ Inc. in the United States, other countries, or both; "Linux" is a registered trademark of Linus Torvalds™ in the United States, other countries, or both; and "Java" and "J2EE" are registered trademarks of Oracle America™, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the system (101) to a communication line (115), and may provide a network interface layer to the TCP/IP communication protocol of a communication function of the operating system of the system (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

In a case where the system (101) is used as a device according to an embodiment of the present invention, a set of keys may be stored in the memory (103) or the disk (108).

Figure 1B:
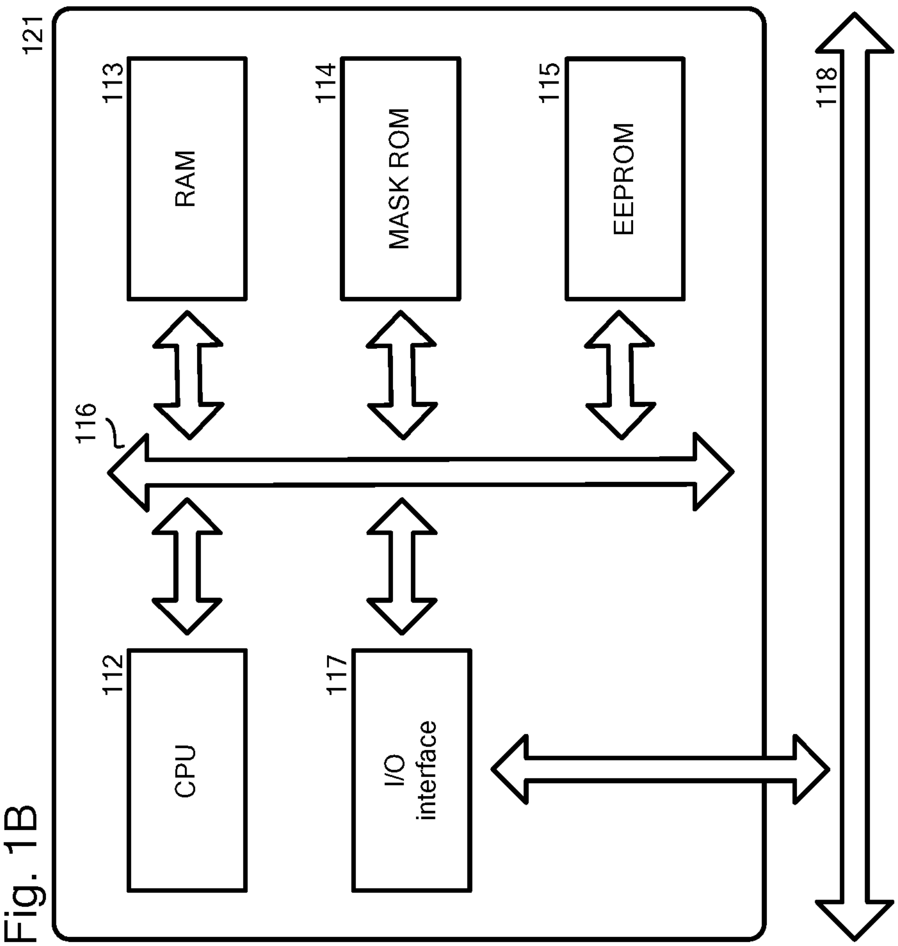
FIG. 1B illustrates an exemplified basic block diagram of a device which may be used in an embodiment of the present invention.

With reference now to FIG. 1B, FIG. 1B illustrates an exemplified basic block diagram of a device which may be used in an embodiment of the present invention.

A device (121) may comprise at least one chip in which one or more CPUs (112), a RAM (113), a MASK ROM (114), EEPROM (115) and an I/O interface (117) are included. The CPUs (112) may be preferably based on an 8-bit, 16-bit or 32-bit architecture. The RAM (113) may be a working memory for the CPUs (112) and is a volatile memory, so all data stored in the RAM (113) is lost when the chip is de-energized. The MASK ROM (114) may contain an operating system for the chip and the operating system may be permanently stored when the chip is manufactured. The EEPROM (115) is a nonvolatile memory, and data and program code can be written to and read from the EEPROM (115) under control of the operating system. The I/O interface (117) may transfer data.

The idea of an embodiment of the present invention is on the basis of the following perceptions.

Each device stores a set of keys. In one embodiment, the set of keys may be used for decrypting an encrypted content or encrypted key, for encrypting a content or key, or for authenticating the device or a user associated with the device.

In a case where a small chip is used for a broadcast encryption (BE), BE usually manages keys in a tree-based manner such as a tree structure. The tree structure may be used in a key management system for generating a set of keys which will be assigned to a device. In a field of a broadcast encryption schema, the tree structure may be generated using an algorithm for the complete subtree method or the Naor, Naor and Lotspiech (NNL) method.

Each chip may store an order of O(log N) or O(log $N^2$) keys, N being the number of chips manufactured in life. In case of $N=2^{30}$, 31 (496 byte, in case size of a key=16 byte) keys are needed in the complete subtree method and 466 (7,456 byte, in case size of a key=16 byte) keys are needed in the NNL method.

In a case where a small chip is used for the BE, it may not be able to store the whole set of keys due to a size of a storage embedded in the small chip.

Further, in a case where the set of keys are successfully stored in a storage embedded in the small chip at the time when the small chip is manufactured, a user may need additional space in order to store other data and may want to store the other data in an area where the set of keys is stored.

Further, in a case where a plurality of sets of keys are stored in a storage embedded in the small chip, additional space in a storage embedded in the small chip may be needed.

Therefore, the set of keys having one or more missing keys may be stored in a storage embedded in the small chip at the time when the small chip is manufactured. Further, a part of the set of keys can be destroyed after manufacturing of the small chip due to fragility of the small chip. This may occur, for example, but is not limited to, cosmetic rays or abnormal current.

Accordingly, there is a necessity of making it possible to reproduce the set of keys even when the set of keys has one or more missing keys. This may bring an improvement of robustness, fault tolerance, or an availability of the set of keys.

An embodiment of the tree structure, the set of keys assigned to a device, and the set of keys having one or more missing keys will be first explained below for ease of understanding of these by referring to FIGS. 2A and 2B mentioned below. Further, an exemplified diagram of supplying deficiency of a key in the set of keys stored in a device using another set of keys will be also explained by referring to FIG. 2B.

Figure 2A:
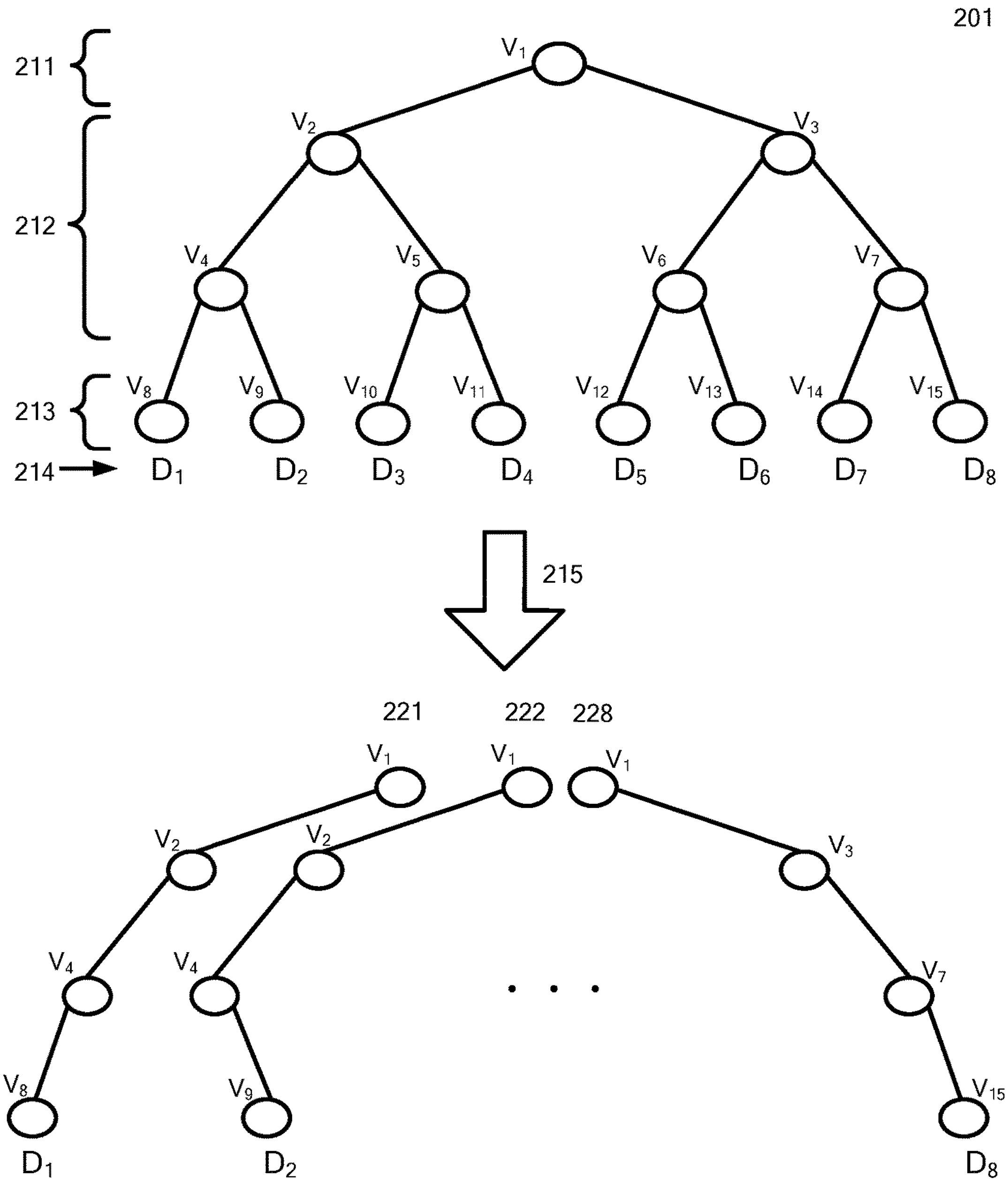
FIG. 2A illustrates an exemplified tree structure and the sets or keys obtained from the tree structure.

With reference now to FIG. 2A, FIG. 2A illustrates an exemplified tree structure which may be used in a key management system for generating sets of keys assigned to a device and the sets of keys obtained from the tree structure.

The tree structure used in the present invention may have a root node, one or more middle nodes, and one or more leaf nodes.

In the tree structure (201), the root node (211) is illustrated as $V_1$; the middle nodes (212) are illustrated as $V_2$, $V_3$, $V_4$, $V_5$, $V_6$ and $V_7$; and the leaf nodes (213) are illustrated as $V_8$, $V_9$, $V_{10}$, $V_{11}$, $V_{12}$, $V_{13}$ $V_{14}$ and $V_{15}$.

Each node may have information on position in the tree structure. The information on position can be described, for example, but is not limited to, using a depth from the root node and the number from the left or right in a common depth.

In nodes including the root node (211), the one or more middle nodes (212) and the one or more leaf nodes (213), each key in the plurality of keys is assigned to each node. Each key may have a unique value.

A tree structure can be used for selecting a set of keys for each device or each user associated with a device.

In one embodiment, for example, the complete subtree method, one key is assigned to each node in the tree structure. In another embodiment, for example, the NNL method, one key is assigned to a pair of nodes in the tree structure.

In the tree structure (201), each key in the plurality of keys is assigned to each node and a part of nodes in this structure (201) is selected as a set of keys for each device.

The eight sets of keys can be generated (221) from this common tree structure (201).

For the set of keys used for the first device $D_1$, the nodes located from the lead node, $V_8$, to the root node, $V_1$, are selected according to the tree structure (201) and then the set of keys, {K1, K2, K4 and K8}, (221) is generated.

For the set of keys used for the second device $D_2$, the nodes located from the lead node, $V_9$, to the root node, $V_1$, are selected according to the tree structure (202) and then the set of keys, {K1, K2, K4 and K9}, (222) is generated.

For the set of keys used for the eighth device $D_8$, the nodes located from the lead node, $V_{15}$, to the root node, $V_1$, are selected according to the tree structure (202) and then the set of keys, {K1, K3, K7 and K15}, (228) is generated, where Ki is the device key that corresponds to node Vi.

The same applies also to the set of keys used for each of the devices $D_3$ to $D_7$.

Each of the eight sets of keys can be assigned to each of the devices $D_1$ to $D_8$ (214), respectively.

Each set of keys generated from the tree structure (201) comprises four keys.

In an embodiment of the present invention, a part or all of the sets of keys may have one or more missing keys.

In one embodiment, the missing key already exists in the set of keys at the time when the set of keys is stored in the device. One or more missing keys in the set of keys may be defined in advance and then the remaining non-missing keys in the set are stored in the device at the time when the chip is manufactured or at the time when the device including the chip is manufactured. The missing key is determined so that a success rate for supplying the deficiency is higher by making a group with a plurality of devices.

In another embodiment, the missing key is generated afterwards in a set of keys after storing the set of keys in the device. The missing key may be generated after the chip is manufactured or the device including the chip is manufactured. This may accidentally or intentionally happen. For the former case, in a case where cosmetic rays are exposed to a device in which the set of keys is stored or abnormal current flows in a device in which the set of keys is stored, a part of the set of keys may be accidentally dropped or deleted. For the latter case, in a case where a set of keys are stored in a storage embedded in the device and disk space for the storage is needed for other purposes, one or more keys in the set of keys are intentionally dropped or deleted in order to expand the disk space and, as a result of the dropping or deletion, the set of keys has one or more missing keys.

A set of keys can be used, for example, but not limited to a device key used for broadcasting encryption.

An example of the set of keys having one or more missing keys will be explained by referring to FIG. 2B mentioned below.

Figure 2B:
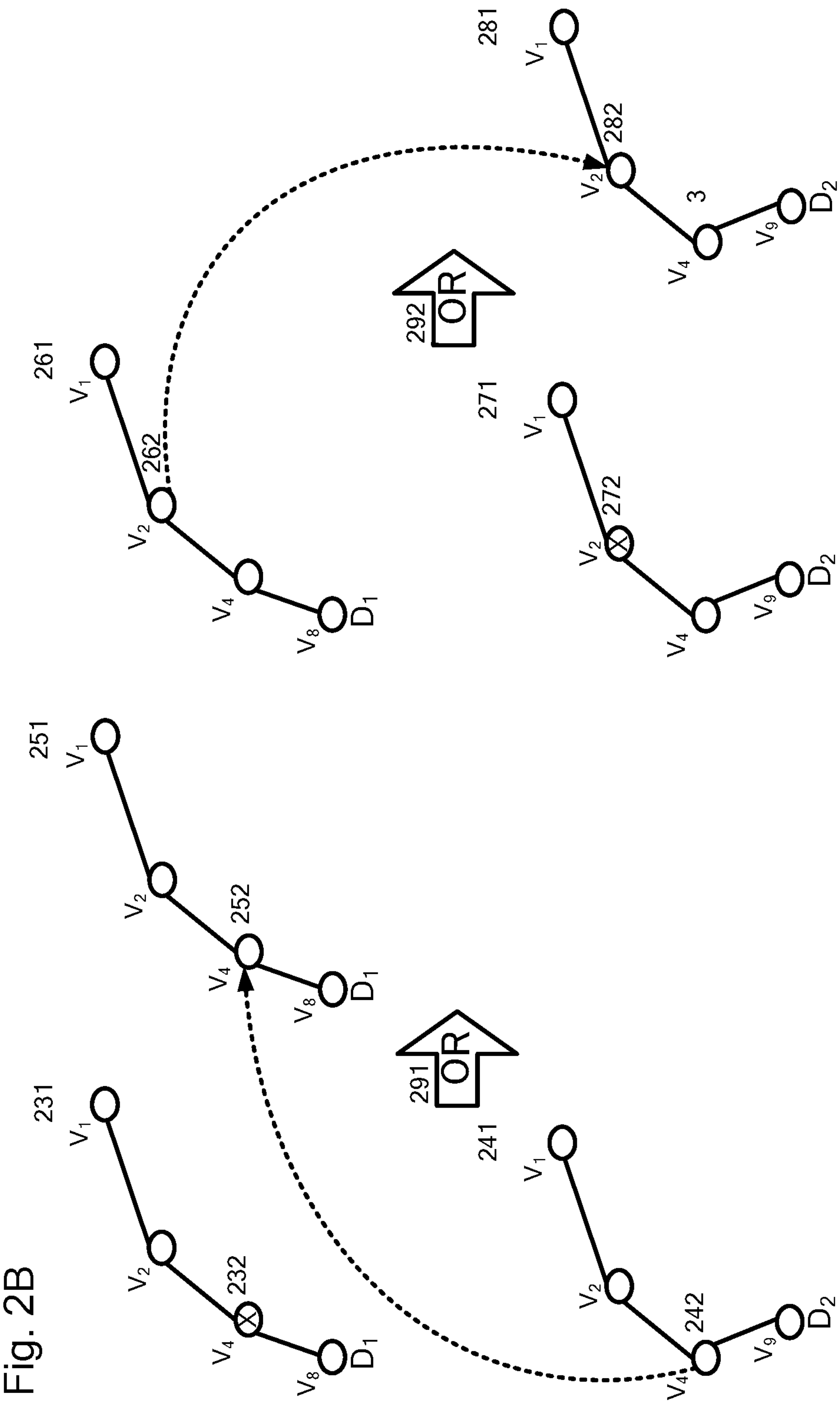
FIG. 2B illustrates an exemplified diagram of supplying deficiency of a key in information on a set of keys stored in a device, according to an embodiment of the present invention.

With reference now to FIG. 2B, FIG. 2B illustrates an embodiment of one or more missing keys in the set of keys stored in a device and an exemplified diagram of supplying deficiency of a key in the set of keys using another set of keys.

FIG. 2B illustrates two embodiments of supplying deficiency of a key in the set of keys using another set of keys.

In a first embodiment (shown in the left side), the set of keys (231) for the first device has a missing key on the node $V_4$ (232). The missing key is illustrated with the mark "X" on the node $V_4$ (232).

Among the sets of keys stored in a key management system, let us suppose that the set of keys (231) for the first device and the set of keys (241) for the second device are grouped together because each of the sets of keys for the first and second devices has the common node $V_1$ and the values of each key is the same.

After making the group, the missing key on the node $V_4$ (232) in the set of keys (231) is supplied from the node $V_4$ (242) on this another set of keys (241) by combining these sets of keys using a condition, "OR", (291) and, therefore, the non-missing key assigned to the node $V_4$ (232) is regarded to be owned by the set of keys (231), as seen in the node $V_4$ (252) in the set of keys (251) which corresponds to the set of keys (231).

The further details of the first embodiment will be explained below by referring to FIGS. 7A and 7B mentioned below.

In a second embodiment (shown in the right side), the set of keys (271) for the second device has a missing key on the node $V_2$ (272). The missing key is illustrated with the mark "X" on the node $V_2$ (272).

Among the sets of keys stored in a key management system, let us suppose that the set of keys (271) for the second device and the set of keys (261) for the first device are grouped together because each of the sets of keys for the devices 2 and 1 has the common node $V_1$ and the values of each key is the same.

After making the group, the missing key on the node $V_2$ (272) in the set of keys (271) is supplied from the node $V_2$ (262) on this another set of keys (261) by combining these sets of keys using a condition, "OR", (292) and, therefore, the non-missing key assigned to the node $V_2$ (272) is regarded to be owned by the set of keys (271), as seen in the node $V_2$ (282) in the set of keys (281) corresponding to the set of keys (271).

FIGS. 3 and 4A to 4C, and FIGS. 5 and 6A to 6C illustrate various embodiments of supplying deficiency of a key in information on a set of keys stored in a first device.

In these embodiments, a key management system, a chip manufacturer, a service provider, a local server may be used as a subject of steps. Further, a first device is used as a device storing a set of keys having one or more missing keys and a second device is used as a device storing a set of keys having a non-missing key corresponding to the missing key.

The key management system may generate a unique ID of each device, and a set of keys for each device. Further, the key management system may estimate the number of devices to be manufactured in life, and assign each key to each node in the tree structure.

The chip manufacturer may manufacture devices in which the set of keys are stored.

The service provider may generate a content which is decrypted by devices using the set of keys.

The local server may transfer the encrypted content to each device to which the encrypted content is delivered. The local server can communicate with the key management system; and a communication between the local server and the key management system may be securely performed. The local server may be, for example, but not limited to a content provider.

Figure 3:
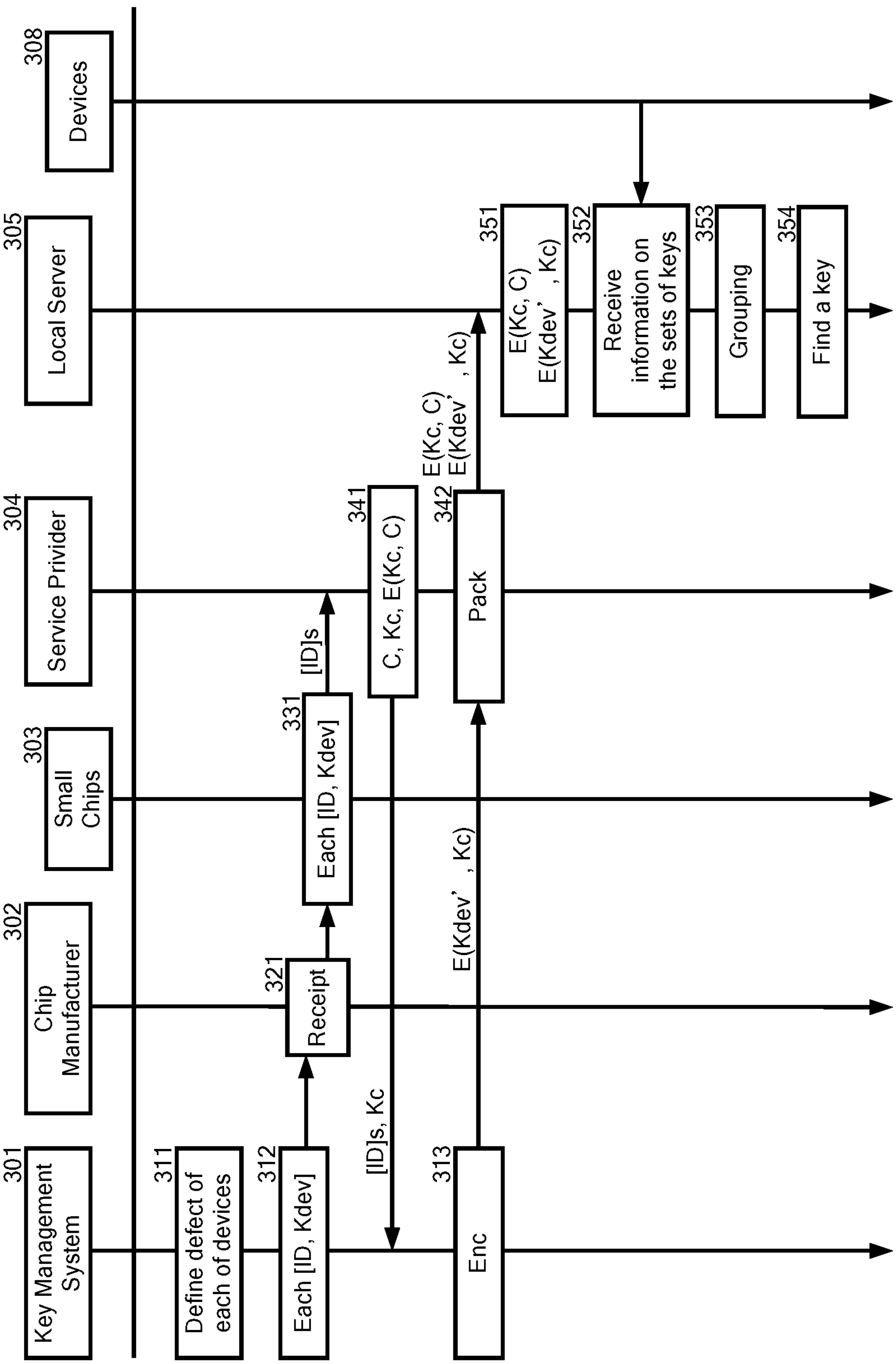
FIG. 3 illustrates an exemplified overall diagram of supplying deficiency of a key in information on a set of keys stored in a first device by receiving, on a local server, sets of keys each from the first device and a second device.

With reference now to FIG. 3, FIG. 3 illustrates an exemplified overall diagram of supplying deficiency of a key in information on a set of keys stored in the first device by receiving, on the local server (305), sets of keys each from this first device and the second device.

In step 311, the key management system (301) generates sets of keys from the tree structure mentioned above and then may define one or more missing keys in each set of keys. The key management system (301) may decide which part or parts in the set of keys are dropped based on the probability of successfully supplying deficiency of a key in the set of keys, taking key distribution of such compromise devices distribution into consideration.

After the definition, the key management system (301) generates, for each device or for each user associated with a device, a set of an ID for a device or user and the set of keys which may have one or more missing keys. Hereinafter, each set of the ID and the set of keys is represented as [ID, Kdev]. Alternatively, even when a key in the set of the keys is not dropped at the time when semiconductors or devices having the semiconductor are manufactured, the key management system (301) may add to the semiconductors or devices information on one or more keys to be dropped.

In step 312, the key management system (301) sends one or more sets, [ID, Kdev]s, to the chip manufacturer (302).

In step 321, the chip manufacturer (302) receives the one or more sets, [ID, Kdev]s from the key management system (301).

In step 331, the chip manufacturer (302) stores each set, [ID, Kdev], into each semiconductors or small chips itself or each device having the semiconductor, at the time when semiconductors or devices are manufactured. Each set may be stored in storage, such as memory, in the semiconductors or devices. After the manufacturing of the semiconductors or devices, the [ID]s which were stored in the semiconductors or devices are sent to the service provider (304).

In step 341, after a receipt of the [ID]s, the service provider (304) reads a content, C, and then decides IDs of devices to which a content, C, is delivered. Further, the service provider (304) generates a content key, Kc, which can be used for encrypting or decrypting a content. The content key, Kc, is randomly generated using, for example, but not limited to, a random number.

The service provider (304) may generate an encrypted content, [E(Kc, C)] and then store it into storage. [E(Kc, C)] denotes that the content, C, is encrypted using the content key, Kc. The encrypted content may be forwarded from the service provider (304) to the local server (305), as stated in the following step 342.

The service provider (304) sends all sets of the ID of each device and the content key, Kc, for the device to the key management system (301). The sets may be securely sent to the key management system (301). One embodiment of securely sending the sets is made by encrypting the sets using a key owned by the service provider (304) and then sending the encrypted set to the key management system (301).

In step 313, the key management system (301) receives the encrypted sets from the service provider (304), for example, by using a device key which is had by the service provider (304), and then decrypts the encrypted sets. After the decryption of the encrypted sets, the key management system (301) obtains IDs from the decrypted sets and then obtains target device keys, Kdev', from the IDs to generate [E(Kdev', Kc)], where [E(Kdev', Kc)]={E(Kdev_1, Kc), . . . , E(Kdev_m, Kc)}, m being the number of device keys in the Kdev'. E(Kdev_i, Kc), i=1, . . . , m, denotes that the content key, Kc, is repeatedly encrypted using each key in the set of keys associated with the ID_i. In one embodiment, the key management system (301) may encrypt the content key, Kc, so that a device having one or more missing keys can decrypt the content key, Kc, which was encrypted without using the determined missing key.

The key management system (301) then sends [E(Kdev', Kc)] to the service provider (304).

In step 342, the service provider (304) receives the [E(Kdev', Kc)] from the key management system (301). The service provider (304) then packs [E(Kc, C)] and [E(Kdev', Kc)] together to send the packed [E(Kc, C)] and [E(Kdev', Kc)] to the local server (305). Thus, the set of the encrypted content keys and an encrypted content which was encrypted with a content key in the set of the encrypted content keys are sent to the local server (305).

In step 351, the local server (305) receives the packed [E(Kc, C)] and [E(Kdev', Kc)] from the service provider (304).

The local server (305) may provide the encrypted content, [E(Kc, C)], and the encrypted content key associated with the ID of the first device to the first device where the content is used.

The first device (not shown) may try to decrypt the encrypted content key, Kc, using the set of keys associated with the ID of the first device. However, in a case where the set of keys stored in the first device has one or more missing keys and a key corresponding to the missing key is needed to decrypt the encrypted content key, the first device cannot decrypt the encrypted content key. Accordingly, after receipt of a notification from the first device that the encrypted content key cannot be decrypted by the first device, the local server (305) supplies deficiency of a key in the set of keys, according to the diagram. The first device may send information on the deficiency of one or more keys. The information, hereafter the information on the set of keys which is securely shared, may be information on a position of each key on the tree structure or a hash value of the one or more keys. Note that information on a set of keys does not include key values themselves.

In step 352, the local server (305) receives the information on the set of keys from each of a plurality of devices (308) including the first and second devices. The set of keys comprises a plurality of keys, each key in the set of keys being assigned to a node among nodes in a tree structure or being assigned to a pair of nodes among nodes in one or more tree structures, and each key in the plurality of keys being assigned to a node.

In step 353, in a case where a position of a key or each key in the tree structure in a first set of keys stored in the first device and a hashed value of this key correspond to a position of a key or each key in the tree structure in a second set of keys stored in the second device among the plurality of devices and a hashed value of this key, respectively, the local server (305) groups the first device and the second device together.

In the diagram described in FIG. 3, in place of performing the step of finding the key (step 354 described in FIG. 3), the steps 451 and 461 mentioned below may be performed.

In step 354, the local server (305) refers the group and then finds a key corresponding to the missing key from the second set of keys or finds a key common in the first set of keys and the second set of keys.

The key corresponding to the missing key may be used to decrypt an encrypted content key by the second device. The key common in the first set of keys and the second set of keys may be used to decrypt an encrypted content key, encrypt a content or decrypt an encrypted content by the first device.

Accordingly, the local server (305) can supply deficiency of a key in the first set of keys stored in the first device, using the second set of keys stored in the second device.

Let us consider the following: in a case where the service provider is requested to send a content, C, which shall be decrypted only by the devices 1, 2, 6, 7 and 8 (see a tree structure described in FIG. 2A), where device-i corresponds to Di which has log N+1 (here and hereafter, base of log=2) node keys from the root node (V1=K1) to the leaf node, the service provider creates a random key for encrypting the content, sends to a key management system IDs (the devices 1, 2, 6, 7 and 8 for the above case) which can decrypt the content and Kc, and then receives MKB=E(Kdev', Kc) (={E(K4, Kc), E(K7, Kc), E(K13, Kc)}), where Ki is the device key that corresponds to node Vi. Then, the service provider sends the MKB and E(Kc, C) to the local server which can locally communicate with each of the devices.

Figure 4A:
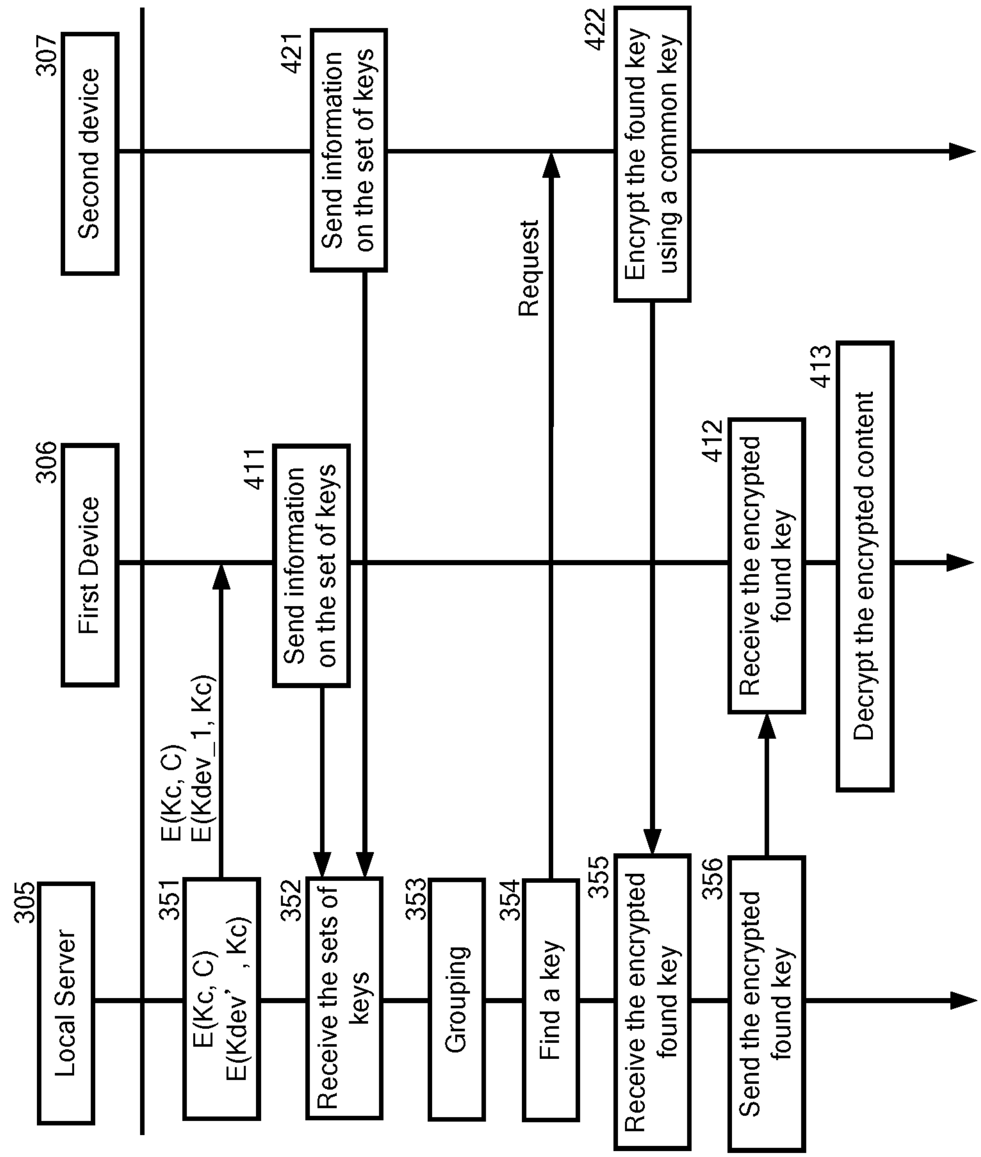
FIGS. 4A and 4B illustrate embodiments according to the present invention of supplying deficiency of a key in information on a set of keys stored in the first device using the local server illustrated in FIG. 3.
Figure 4B:
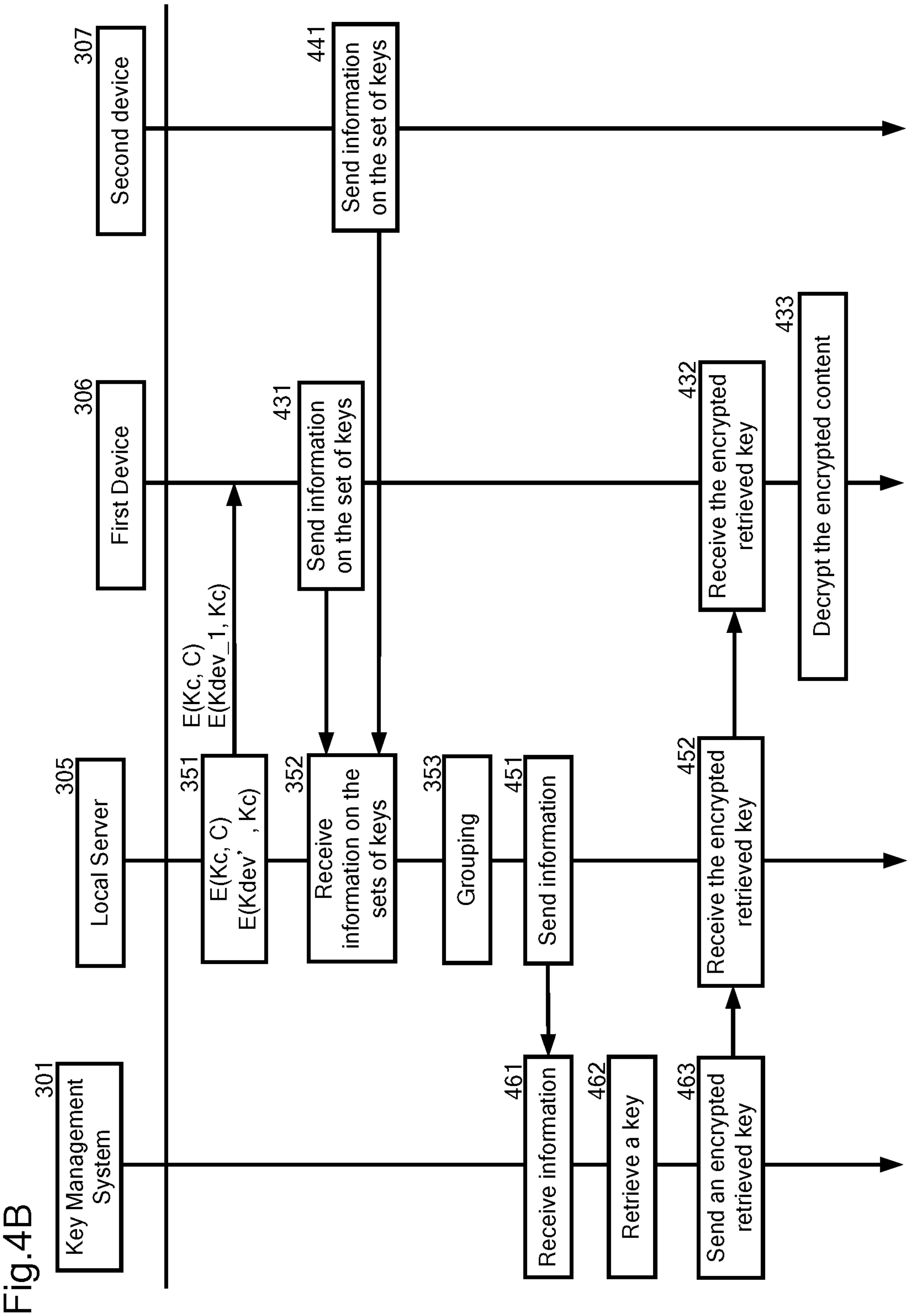

FIGS. 4A and 4B each illustrates a separate embodiment according to the present invention of supplying deficiency of a key in the set of keys stored in the first device using the local server (305) illustrated in FIG. 3.

With reference now to FIG. 4A, FIG. 4A illustrates an embodiment of supplying deficiency of a key in information on a set of keys stored in the first device (306) using the local server (305) by finding, from the information on the set of keys sent from the second device (307), a key corresponding to a missing key in the set of keys stored in the first device (306), encrypting the found key by a common key between the first device and second device and supplying to the local server (305) and then sending the encrypted found key from the local server (305) to the first device (306).

The steps 351 to 353 described in FIG. 4A correspond to those described in FIG. 3, respectively. Accordingly, the overlapping explanation of the steps 351 to 354 will be omitted here.

As stated above, in the step 351, the local server (305) may provide the encrypted content, [E(Kc, C)], and the encrypted content key associated with the ID of the first device (306), [E(Kdev_1, Kc)] to the first device (306) where the content is used.

In a case where the first device (306) is not able to decrypt the encrypted content key, the first device (306) may send the information on the set of keys stored in the first device (306) to the local server (305).

In step 421, the second device (307) may send the information on the set of keys stored in the second device (307) to the local server (305). The second device (307) may send the information on the set of keys to the local server (305) prior to or after the step 411.

In step 353, the local server (305) groups the first device (306) and the second device (307) together.

In step 354, the local server (305) sends, to the devices including the second device (307), a request for sending a key corresponding to the missing key in order to find a key corresponding to the missing key.

In step 422, after finding, in the second device (307), the key corresponding to the missing key, the second device (307) encrypts the found key using a common key between the first device (307) and the second device (307) and then sends the encrypted found key to the local server (305).

In step 355, the local server (305) receives the encrypted found key from the second device (307).

In step 356, the local server (305) sends the encrypted found key to the first device.

In step 412, the first device (306) receives the encrypted found key from the local server (305).

In step 413, the first device (306) decrypts the encrypted found key using the common key used to encrypt this found key and then decrypts the encrypted content key using the decrypted found key to obtain a decrypted content key. The first device (306) then decrypts the encrypted content using the decrypted content key.

With reference now to FIG. 4B, FIG. 4B illustrates an embodiment according to the present invention of supplying deficiency of a key in information on a set of keys stored in the first device (306) using the local server (305) by finding, from a tree structure stored on a key management system, a key corresponding to a missing key in the set of keys stored in the first device (306) and then securely sending the missing key from the key management system (301) to the first device (306) via the local server (305).

The steps 351 to 354 described in FIG. 4B correspond to those described in FIG. 3, respectively. Accordingly, the overlapping explanation of the steps 351 to 354 will be omitted here.

The steps 431 and 441 described in FIG. 4B correspond to the steps 411 and 421 described in FIG. 4A, respectively.

In step 451, in a case where there are one or more missing keys in the first set of keys, the local server (305) sends information on the missing key to the key management system (301). The communication between the local server (305) and the key management system (301) may be performed by an encryption using a device key which is had by the first device (306).

In step 461, the key management system (301) receives the information on the missing key from the local server (305).

In step 462, the key management system (301) retrieves a non-missing key corresponding to the missing key from the sets of keys obtained from the tree structure, encrypts the retrieved key using a device key which is had by the first device (306).

In step 463, the key management system (301) sends the encrypted retrieved key to the local server (305).

In step 452, the local server (305) receives the encrypted retrieved key and then sends the encrypted retrieved key to the first device (306).

In step 432, the first device (306) receives the encrypted retrieved key from the key management system (301) via the local server (305).

In step 433, the first device (306) decrypts the encrypted retrieved key using the key used to encrypt the retrieved key, and then decrypts the encrypted content key using the decrypted retrieved key. The first device (306) then decrypts the encrypted content using the decrypted content key.

Figure 4C:
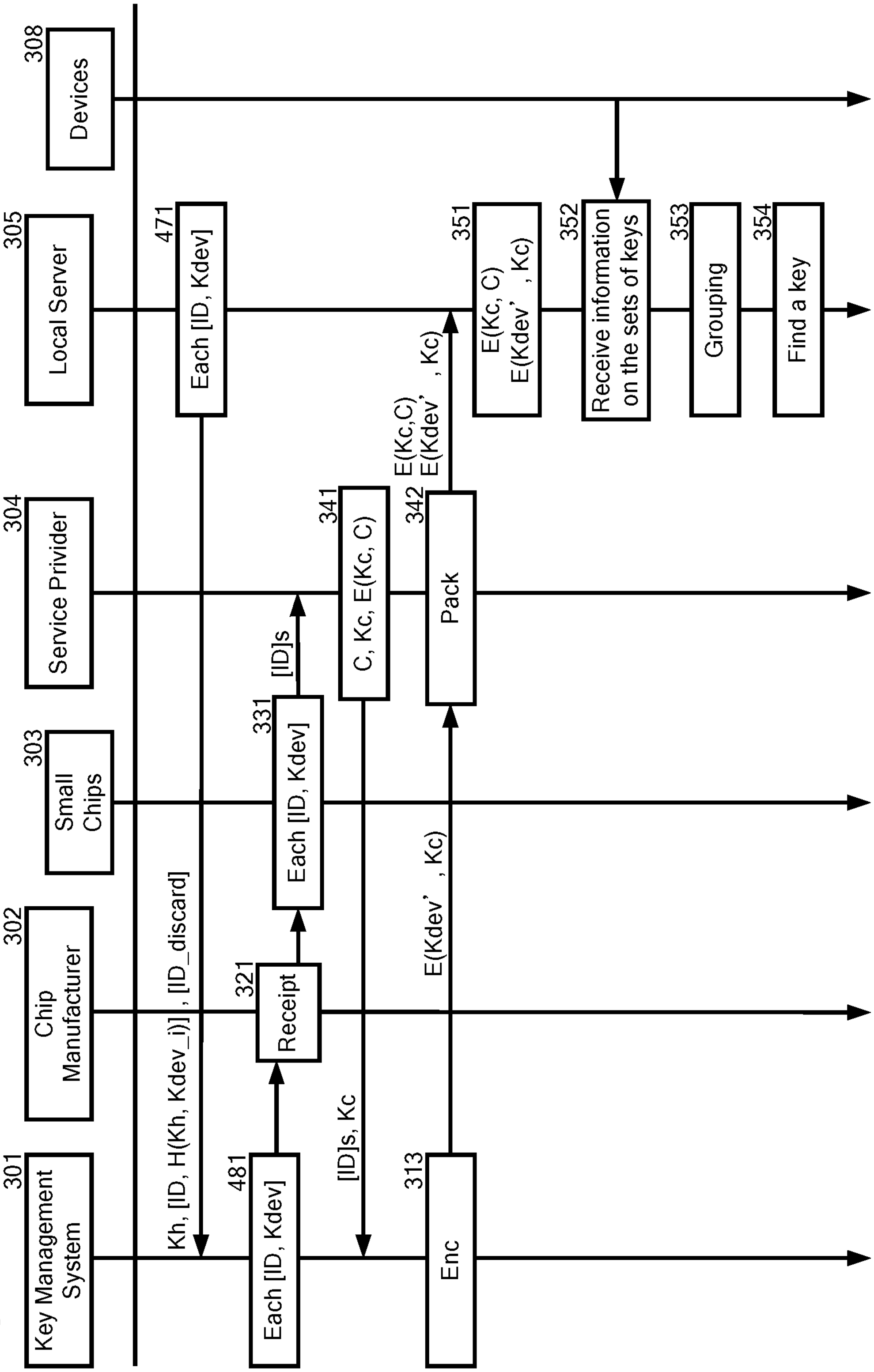
FIG. 4C illustrates an embodiment according to the present invention of invalidating, by the key management system, all keys in a set of keys stored in the device having the ID to be discarded, and avoiding to use the missing key to the IDs which may be used in the future.

With reference now to FIG. 4C, FIG. 4C illustrates an embodiment according to the present invention of invalidating, by the key management system, all keys in a set of keys stored in the device having the ID to be discarded, and avoiding using the missing key to the IDs which may be used in the future.

The step 471 may start in a case where the missing key is found and there is a possibility that the first device (306) will be used again. In this embodiment, the key management system (301) does not use the missing key to encrypt a content key for devices with the ID in the future.

In step 471, the local server (305) may prepare the ID of the first device (306), a hash key, Kh, and hash values for all keys in the first set of keys for the first device (306), H(Kh, Kdev_i). Further, the local server (305) may prepare one or more IDs which shall be discarded, [ID_discard].

The local server (305) sends the Kh, [ID, H(Kh, Kdev_i)], and [ID_discard] to the key management system (301).

In step 481, the key management system (301) generates the set of keys which does not have the missing key associated with the IDs which were sent from the local server (305).

In one embodiment, the key management system (301) repeats an encryption of a content key without using a key corresponding to the missing key after the receipt of the ID.

After the generation of the set of keys, the key management system (301) sends one or more sets, [ID, Kdev]s, to the chip manufacturer (302) to repeat steps 321, 331, 341, 313, 342 and 351 to 354. For steps 321, 331, 341, 313, 342 and 351 to 354, the same explanation mentioned above can be applied here.

Figure 5:
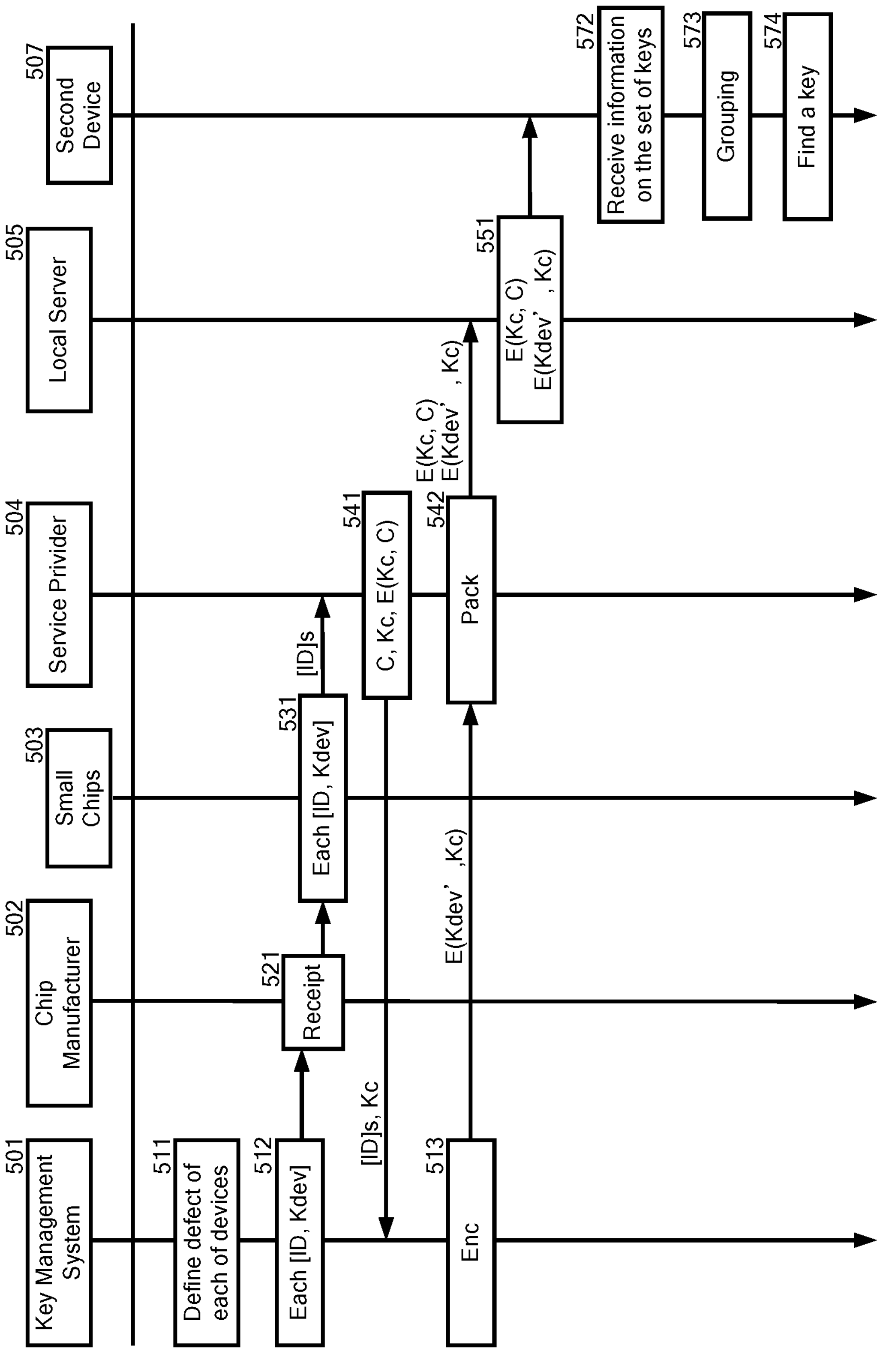
FIG. 5 illustrates an exemplified overall diagram of supplying deficiency of a key in information on a set of keys stored in the first device, by receiving, on the second device, a set of keys stored in the first device.

With reference now to FIG. 5, FIG. 5 illustrates an exemplified overall diagram of supplying deficiency of a key in information on a set of keys stored in the first device, by receiving, on the second device, the information on the set of keys stored in the first device.

The steps 511 to 542 described in FIG. 5 correspond to the steps 311 to 342 described in FIG. 3, respectively. Therefore, the explanation of the steps 511 to 542 will be omitted here.

In step 551, the local server (505) receives the packed [E(Kc, C)] and [E(Kdev', Kc)] from the service provider (504).

The local server (505) may provide the encrypted content, [E(Kc, C)], and the encrypted content key associated with the ID of the first device (not shown) to the first device where the content is used.

The first device may try to decrypt the encrypted content key using the set of keys associated with the ID of the first device. However, in a case where the set of keys stored in the first device has one or more missing keys, and a key corresponding to the missing key is needed to decrypt the encrypted content key, the first device cannot decrypt the encrypted content key. Accordingly, after receipt of a notification from the first device that the encrypted content key cannot be decrypted by the first device, the second device (507) supplies deficiency of a key in the set of keys, according to the diagram. The first device may send information on the deficiency of the key to the local server (505).

In response to receipt of the information, the local server (505) may provide the encrypted content, [E(Kc, C)], and the encrypted content key associated with the ID of the second device (507) to the second device (507).

In step 572, the second device (507) receives the information on the set of keys from at least one device including the first device. The set of keys comprises a plurality of keys, each key in the set of keys being assigned to a node among nodes in a tree structure or being assigned to a pair of nodes among nodes in one or more tree structures, and each key in the plurality of keys being assigned to a node.

In step 573, in a case where a position of a key or each key in the tree structure in a first set of keys stored in the first device and a hashed value of this key corresponds to a position of a key or each key in the tree structure in a second set of keys stored in the second device (507) among the plurality of devices and a hashed value of this key, respectively, the second device (507) groups the first device and the second device (507) together.

In step 574, the second device (507) refers the group and then finds a key corresponding to the missing key from the second set of keys or finds a key common in the first set of keys and the second set of keys.

The key corresponding to the missing key may be used to decrypt an encrypted content key. The key common in the first set of keys and the second set of keys may be used to decrypt an encrypted content key, encrypt a content or decrypt an encrypted content.

Accordingly, the second device (507) can supply deficiency of a key in the first set of keys stored in the first device, using the second set of keys stored in the second device (507).

Figure 6A:
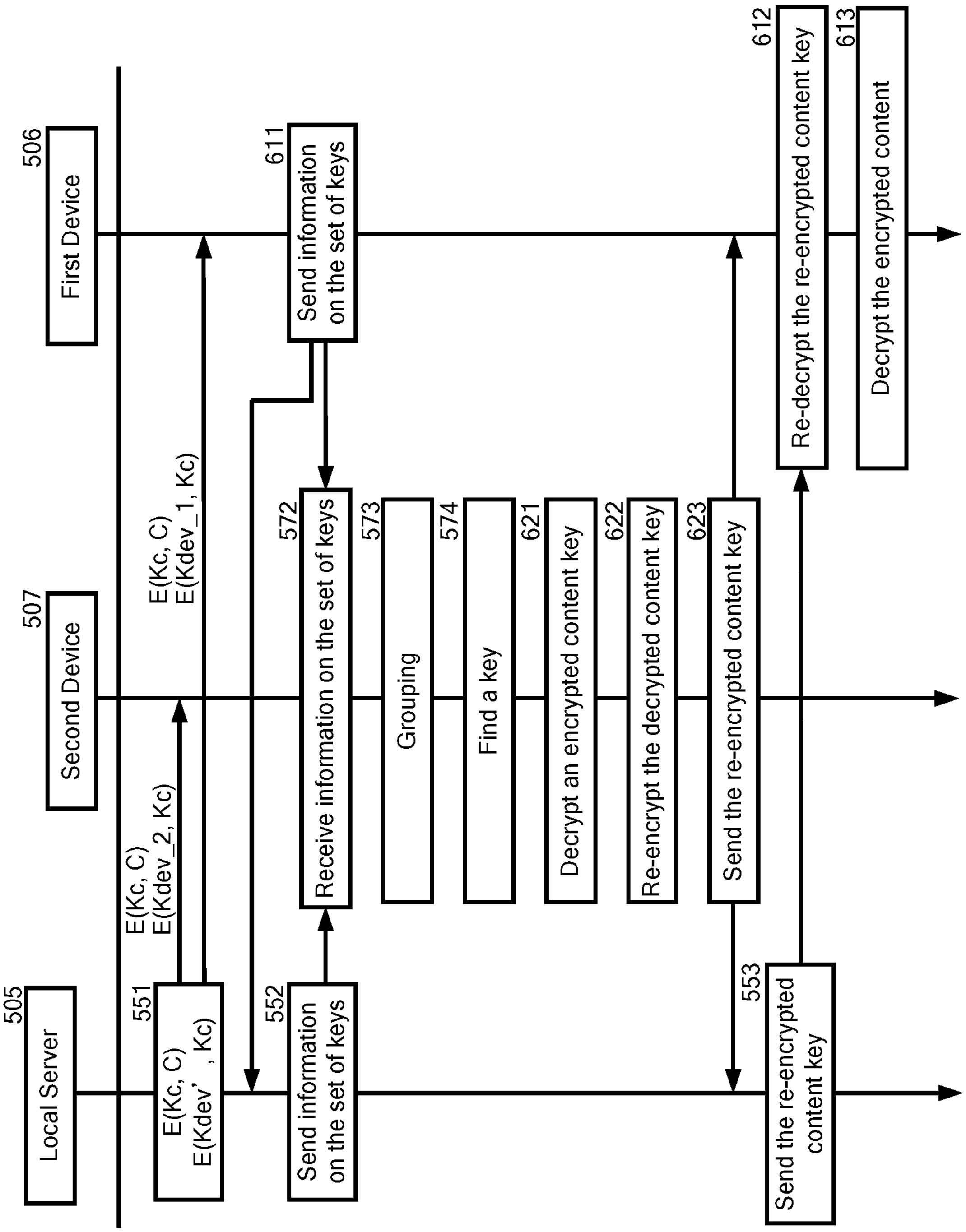
FIGS. 6A, 6B and 6C illustrate embodiments according to the present invention of supplying deficiency of a key in information on a set of keys stored in the first device using the second device illustrated in FIG. 5.
Figure 6B:
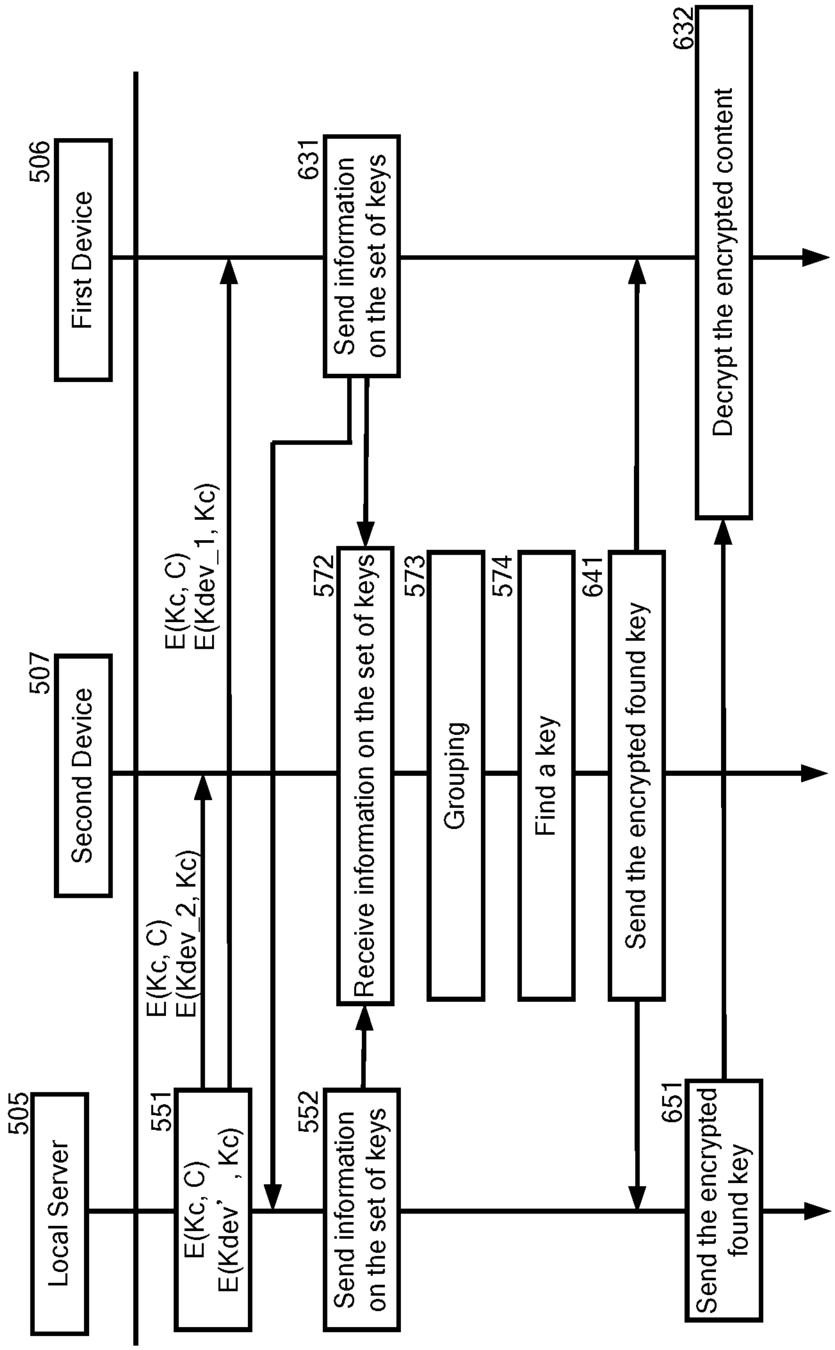
Figure 6C:
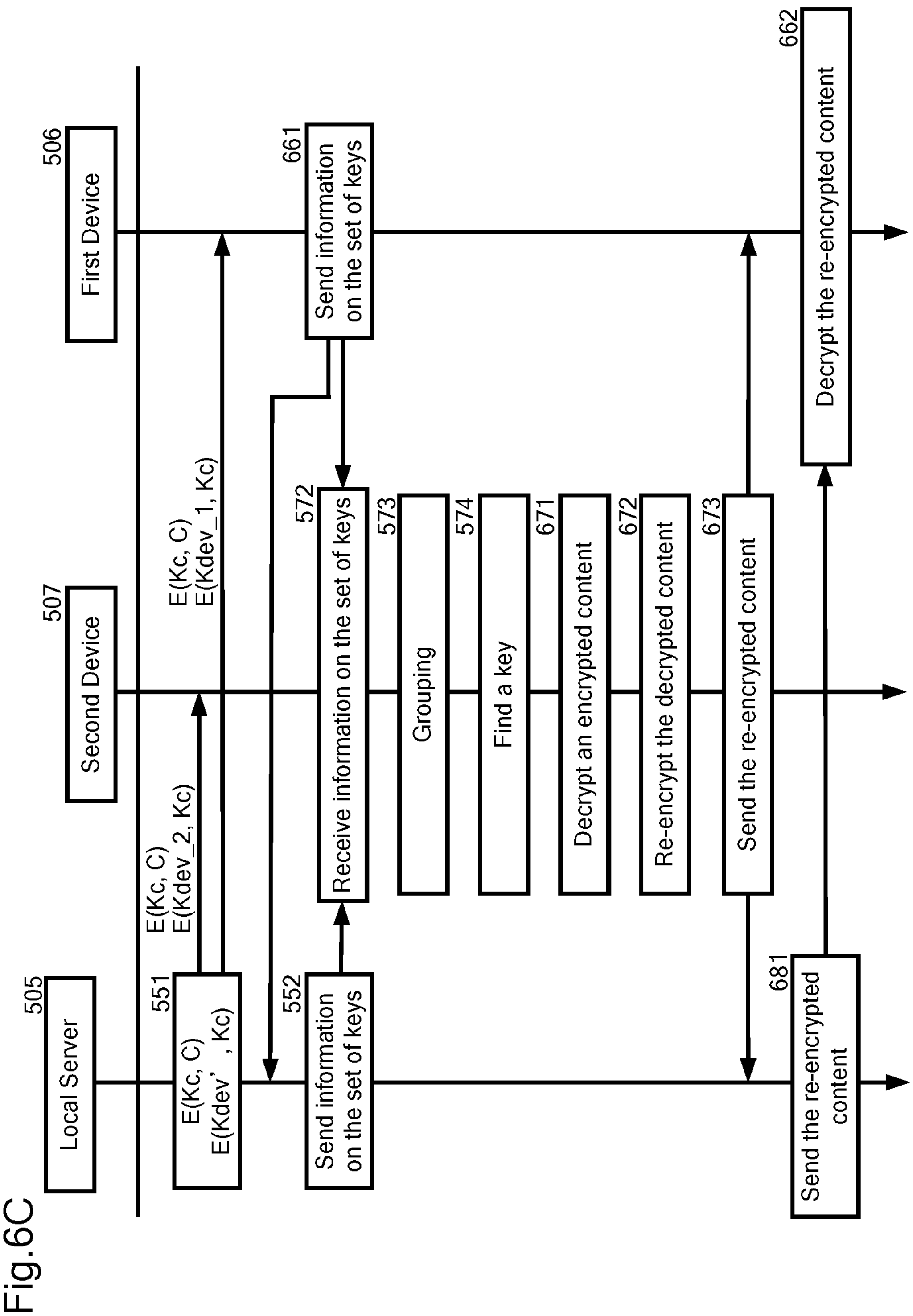

FIGS. 6A to 6C each illustrates a separate embodiment according to the present invention of supplying deficiency of a key in information on a set of keys stored in the first device (506) using the second device (507) illustrated in FIG. 5.

With reference now to FIG. 6A, FIG. 6A illustrates an embodiment according to the present invention of supplying deficiency of a key in information on a set of keys stored in the first device (506) using a set of keys stored in the second device (507) by decrypting an encrypted content key using a key in the set of keys stored in the second device (507), re-encrypting the decrypted content key using a key common in the set of keys stored in the first device (506) and the set of keys stored in the second device (507) and then sending the re-encrypted content key from the second device (507) to the first device (506).

The step 551 described in FIG. 6A corresponds to that described in FIG. 5. Accordingly, the overlapping explanation of the step 551 will be omitted here.

As stated above, in the step 551, the local server (505) may provide the encrypted content, [E(Kc, C)], and the encrypted content key associated with the ID of the first device (506), [E(Kdev_1, Kc)] to the first device (506) where the content is used. Further, the local server (505) may provide the encrypted content, [E(Kc, C)], and the encrypted content key associated with the ID of the second device (507), [E(Kdev_2, Kc)] to the second device (507).

In step 611, in a case where the first device (506) is not able to decrypt the encrypted content key, the first device (506) may directly send the information on the set of keys stored in the first device (506) to the second device (507) or send the information on the set of keys stored in the first device (506) to the local server (505) in order to transfer this information on the set of keys to the second device (507) via the local server (505). For the latter case, in step 552, the local server (505) transfers the information on the set of keys to the second device (507).

The steps 572 to 574 described in FIG. 6A correspond to those described in FIG. 5, respectively. Accordingly, the overlapping explanation of the steps 572 to 574 will be omitted here.

In step 572, the second device (507) receives information on the set of keys stored in the first device (506) and retrieves the set of keys stored in the second device (507) from the storage embedded in the second device (507).

In step 621, the second device (507) decrypts the encrypted content key using a key in the second set of keys retrieved from the second device (507).

In step 622, the second device (507) re-encrypts the decrypted content key using a key common in the first set of keys stored in the first device (506) and the second set of keys stored in the second device (507).

In step 623, the second device (507) may directly send the re-encrypted content key to the first device (506) or send the re-encrypted content key to the local server (505) in order to transfer the re-encrypted content key to the first device (506) via the local server (505). For the latter case, in step 553, the local server (505) transfers the re-encrypted content key to the first device (506).

In step 612, the first device (506) re-decrypts the re-encrypted content key using the key common in the first set of keys and the second set of keys to obtain the re-decrypted content key. Note that the first device can decrypt the content even if the missing key itself is not found in the group of the keys.

In step 613, the first device (506) decrypts the encrypted content sent from the second device (507) or the local server (505) using the re-decrypted content key.

With reference now to FIG. 6B, FIG. 6B illustrates an embodiment according to the present invention of supplying deficiency of a key in information on a set of keys stored in the first device (506) using a set of keys stored in the second device (507) by finding, from the set of keys stored in the second device (507), a key corresponding to a missing key in the set of keys stored in a first device (506) and then sending the found key securely from the second device (506) to the first device (507).

The steps 551 and 572 to 574 described in FIG. 6B correspond to those described in FIG. 5, respectively. Accordingly, the overlapping explanation of the steps 551 and 572 to 574 will be omitted here.

The step 631 described in FIG. 6B corresponds to the step 611 described in FIG. 5A. Accordingly, the overlapping explanation of the step 631 will be omitted here.

In step 641, the second device (507) encrypts the found key using a common device key between the first (506) and the second device (507) and directly sends the encrypted found key to the first device (506) or sends the encrypted found key to the local server (505), in order to transfer the encrypted found key to the first device (506) via the local server (505). For the latter case, in step 651, the local server (505) transfers the encrypted found key to the first device (506).

In step 632, the first device (506) receives the encrypted found key and then decrypts the encrypted found key using the common device key. After obtaining the decrypted found key, the first device (506) decrypts the encrypted content key using the found key to obtain a decrypted content key. The first device (506) then decrypts the encrypted content using the decrypted content key.

With reference now to FIG. 6C, FIG. 6C illustrates an embodiment according to the present invention of supplying deficiency of a key in information on a set of keys stored in the first device (506) using a set of keys stored in the second device (507) by finding, from the set of keys stored in the second device (507), a key corresponding to a missing key in the set of keys stored in the first device (506), decrypting an encrypted content using the found key, re-encrypting the decrypted content using a key common in the set of keys stored in the first device (506) and the set of keys stored in the second device (507) and then sending the re-encrypted content from the second device (507) to the first device (506).

The steps 551 and 572 to 574 described in FIG. 6C correspond to those described in FIG. 5, respectively. Accordingly, the overlapping explanation of the steps 551 and 572 to 574 will be omitted here.

The step 661 described in FIG. 6C corresponds to the step 611 described in FIG. 5A. Accordingly, the overlapping explanation of the step 661 will be omitted here.

In step 671, the second device (507) decrypts an encrypted content using the found key.

In step 672, the second device (507) re-encrypts the decrypted content using a key common in the first set of keys stored in the first device (506) and the second set of keys stored in the second device (507).

In step 673, the second device (507) directly sends the re-encrypted content to the first device (506) or sends the re-encrypted content to the local server (505) in order to transfer the re-encrypted content to the first device (506) via the local server (505). For the latter case, in step 681, the local server (505) transfers the re-encrypted content to the first device (506).

In step 662, the first device (506) decrypts the encrypted content using the key used to encrypt the content. Note that the first device can decrypt the content even if the missing key itself is not found in the group of the keys.

Figure 7A:
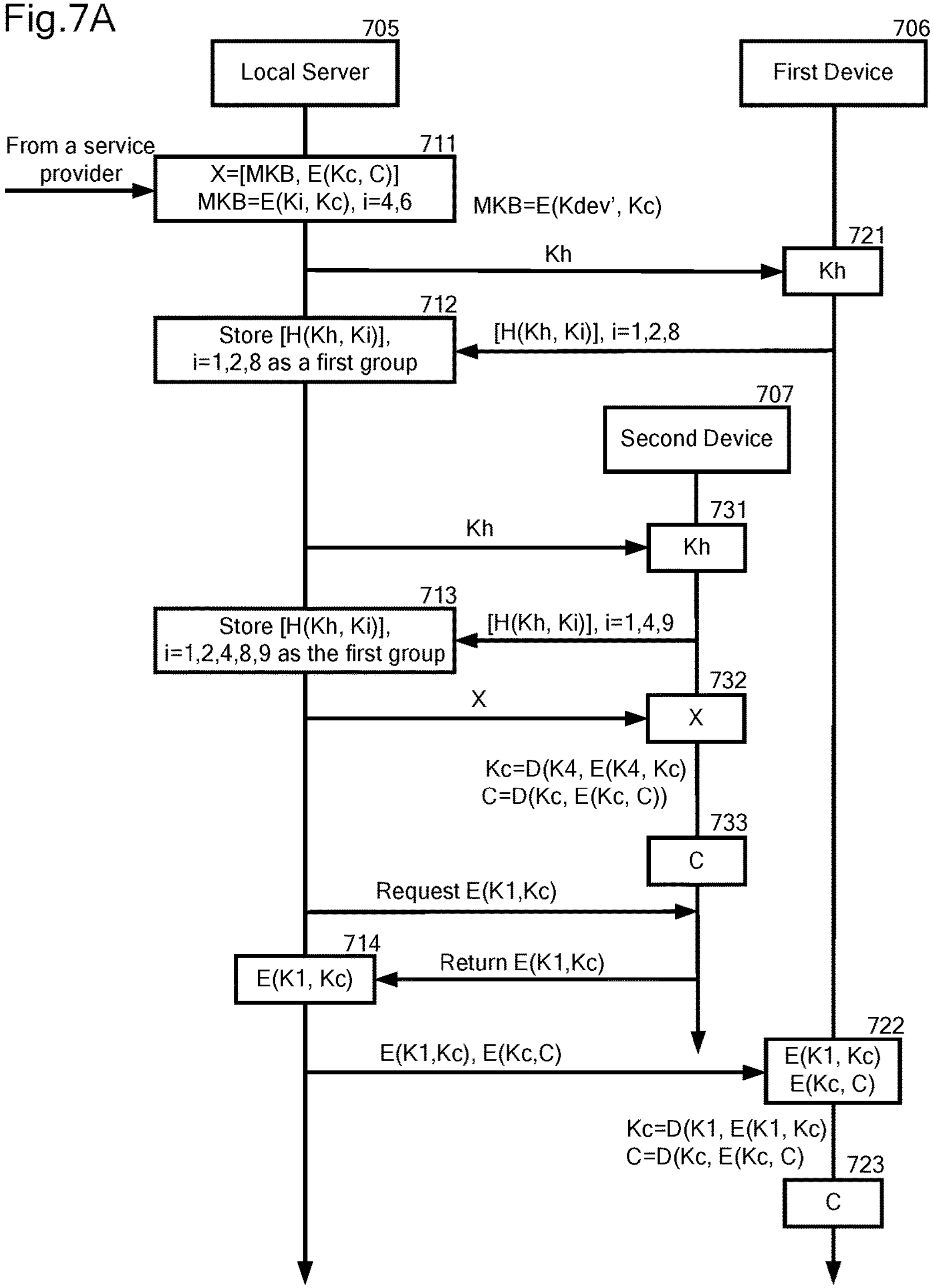
FIG. 7A illustrates an embodiment according to the present invention of delivering a key corresponding to a missing key in the set of keys stored in the first device from a local server to the first device.
Figure 7B:
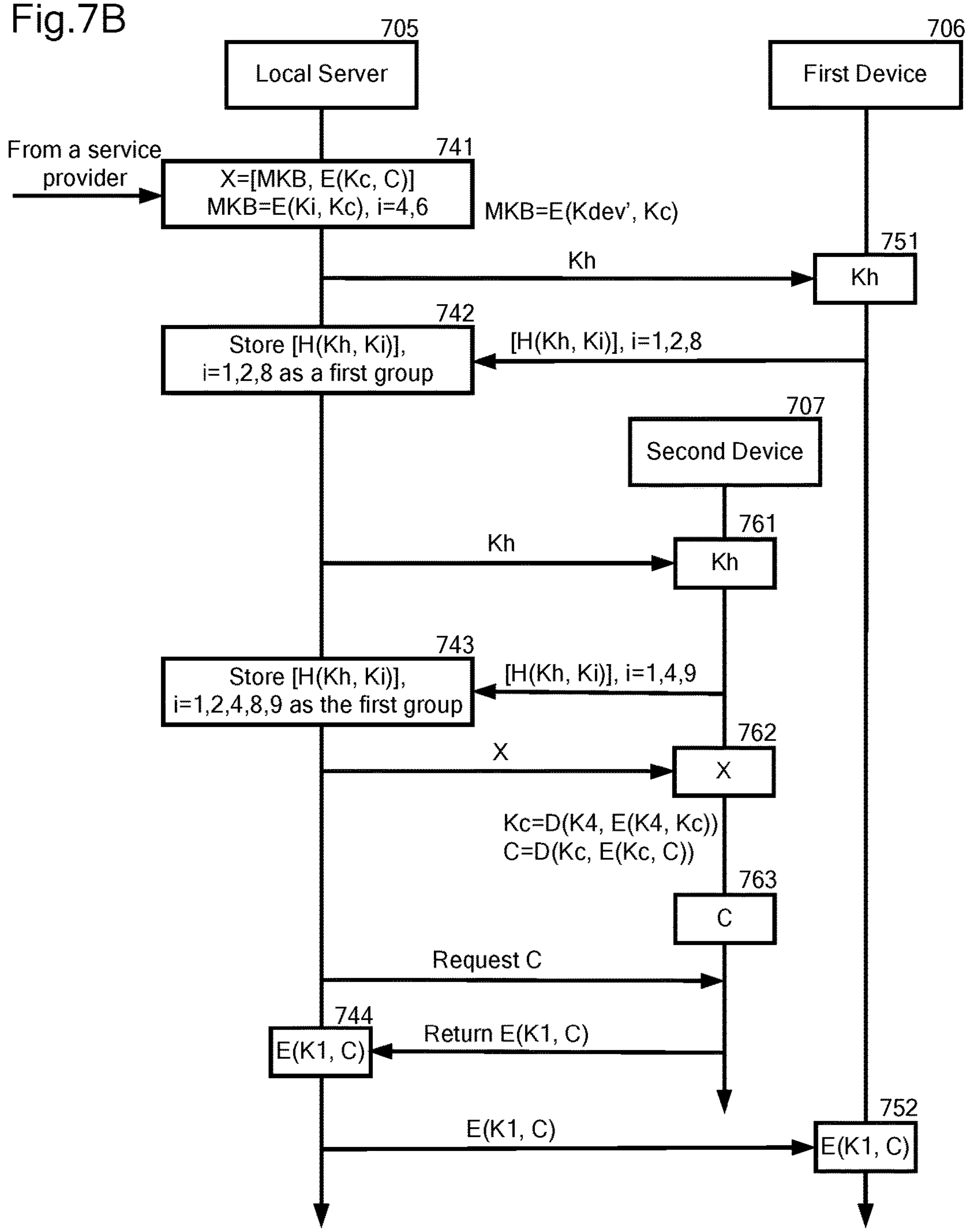
FIG. 7B illustrates an embodiment according to the present invention of delivering a content from a local server to the first device.

FIGS. 7A and 7B each illustrates an embodiment of delivering a key corresponding to a missing key in the set of keys stored in the first device (706) or a content.

In both embodiments, the local server (705) allows a supply of deficiency of a key in information on a set of keys stored in the first device (706). Let us suppose that the set of keys for the first device (706) is the same as the set of keys described in FIG. 2B, 231, and is represented as {$K_1$, $K_2$ and $K_8$} and, accordingly, has a missing key on the node $V_4$. Further, let us suppose that the set of keys for the second device (707) is the same as the set of keys described in FIG. 2B, 271, and is represented as {$K_1$, $K_4$ and $K_9$} and, accordingly, has a missing key on the node $V_2$.

With reference now to FIG. 7A, FIG. 7A illustrates an embodiment according to the present invention of delivering a key corresponding to a missing key in the set of keys stored in the first device (706) from the local server (705) or second device (707) to the first device (706).

In step 711, the local server (705) receives a set of the MKB and the encrypted content, E (Kc, C) from a service provider. The set, X, can be represented as X=[MKB, E (Kc, C)]. The MKB denotes E(Kdev', Kc) mentioned above. Let us suppose that MKB=E(Ki, Kc), i=4, 6, where the content is supplied for D8, D9, D12, and D13.

After receipt of the set, the local server (705) sends a hash key, Kh, to the first device (706).

In step 721, the first device (706) receives the hash key sent from the local server (705) and then calculates the hash value of the set of keys, {K1, K2 and K8}, using the hash key. The hash value is represented as [H(Kh, Ki)], i=1, 2, 8, where H(Kh, Ki) denotes the Ki is hashed using the hash key, Kh.

In step 712, the local server (705) stores the received hash values sent from the first device (706) as a first group together with the position of each key in the tree structure.

Similarly, after receipt of the set, the local server (705) sends the hash key, Kh, to the second device (707).

In step 731, the second device (707) receives the hash key sent from the local server (705) and then calculates the hash value of the set of keys, {K1, K4 and K9}, using the hash key. Let us suppose that the hash value is [H(Kh, Ki)], i=1, 4, 9.

In step 713, the local server (705) stores the received hash values sent from the second device (707) as the first group together with the position of each key in the tree structure.

The local server (705) performs the supply of a deficiency of a key in the set of stores in the first device (706). Let us suppose that the second device (707) has a key included in Kdev' (or a key common with a key in the set of keys stored in the first device (706), Kdev_s) and has Kdev_i (i=1, . . . , m).

In a case where a device has Kdev_i (i=1, . . . , m) included in Kdev', X mentioned above is directly delivered to this device via the local server (705). However, in a case where the first device (706) has one or more missing keys but originally has a key in Kdev', the local server (705) lets the second device (707) send E(Kdev_s, Kc) and E(Kc, C) to the first device (706) directly or via the local server (705). E(Kdev_s, Kc) denotes that a content key, Kc, is encrypted using the common key, Kdev_s. E(Kc, C) denotes that a content is encrypted using the content key.

The details of the grouping of the first device (706) and the second device (707) will be also explained below by referring to FIG. 11 mentioned below.

In a case where such Kdev_s is not found now but found later with another device, E(Kdev_s,Kc) and E(Kc,C) are delivered to the first device (706) from such a device or via the local server (705) at that time.

The local server (705) may receive encrypted Kc or encrypted C directly from the second device (707) and then transfer the encrypted Kc or encrypted C to the first device (706); or the second device (707) may directly send Kc or C to the first device (706) in a case where a channel between the second device (707) and the first device (706) is securely protected. In one embodiment of securing the channel is to share a common secret key, Kx, between each device to exchange data encrypted by the common secret key, Kx.

In step 732, the second device (707) may decrypt the encrypted content key, E(K4, Kc), using the non-missing key, K4, corresponding to the missing key.

In step 733, after the decryption of the encrypted content key, the second device (707) further decrypts the encrypted content using the decrypted content key. Kc=D(K4, E(K4, Kc)), to generated the decrypted content, C=D (Kc, E(Kc, C)).

Then, the second device (707) may re-encrypt the decrypted content key using a common key between the set of keys stored in the first device (706) and the set of keys stored in the second device (707) to generate the re-encrypted content key, E(K1, Kc), which was encrypted using the common key, K1.

The local server (705) may send a request for sending E (K1, Kc) to the second device (707).

In response to the request, the second device (707) sends the encrypted content key, E(K1, Kc), to the local server (705).

In step 714, the local server (705) receives the encrypted content key, E(K1, Kc).

In response to receipt of the encrypted content key, E(K1, Kc), the local server (705) transfers the encrypted content key, E(K1, Kc) and the encrypted content, E(Kc, C), to the first device (706).

In step 722, in receipt of the encrypted content key, E(K1, Kc), and the encrypted content, E(Kc, C), the first device (706) decrypts the encrypted content key, E(K1, Kc), using the K1 in the set of keys to generate the decrypted content key, Kc=D(K1, E(K1, Kc)).

In step 723, after the decryption of the encrypted content key, the first device (706) further decrypts the encrypted content, E(Kc, C), to generate the decrypted content, C=D (Kc, E(Kc, C)).

With reference now to FIG. 7B, FIG. 7B illustrates an embodiment according to the present invention of delivering a content from the local server (705) or the second device (707) to the first device (706).

The steps 741 to 763 described in FIG. 7B correspond to the steps 711 to 733 described in FIG. 7A, respectively. Therefore, the explanation of the steps 741 to 763 will be omitted here.

After step 763, the local server (705) may send to the second device (707) a request for sending the content to be delivered to the first device (706).

In response to the request, the second device (707) sends the encrypted content, C, to the local server (705) or to the first device (706) directly.

In step 744, the local server (705) receives the encrypted content and then transfers it to the first device (706).

In step 752, the first device (706) receives the encrypted content and then decrypts the encrypted content using the key used to encrypt the content.

Figure 8A:
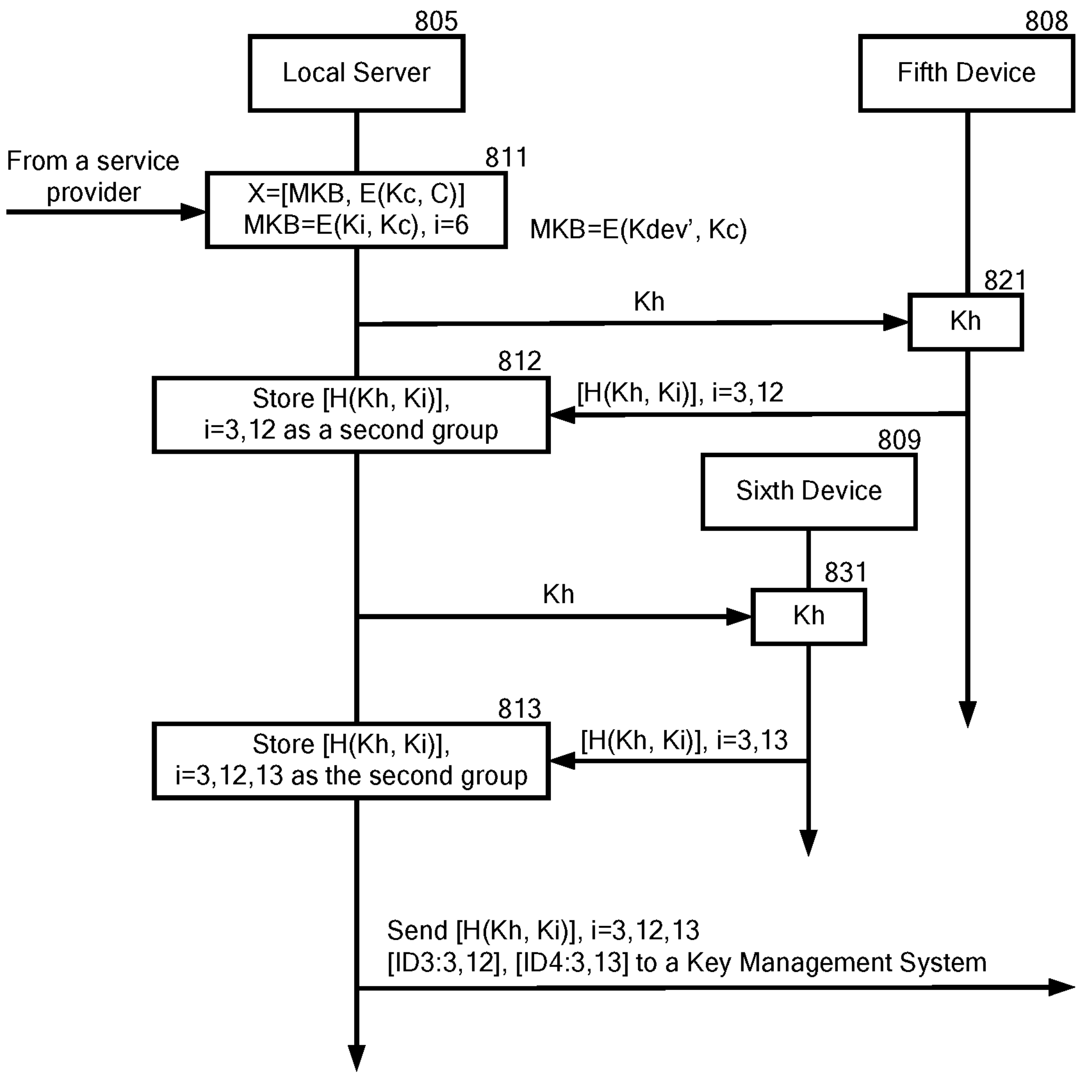
FIGS. 8A and 8B illustrate a case of not finding a key corresponding to a missing key in the set of keys stored in the first device.
Figure 8B:
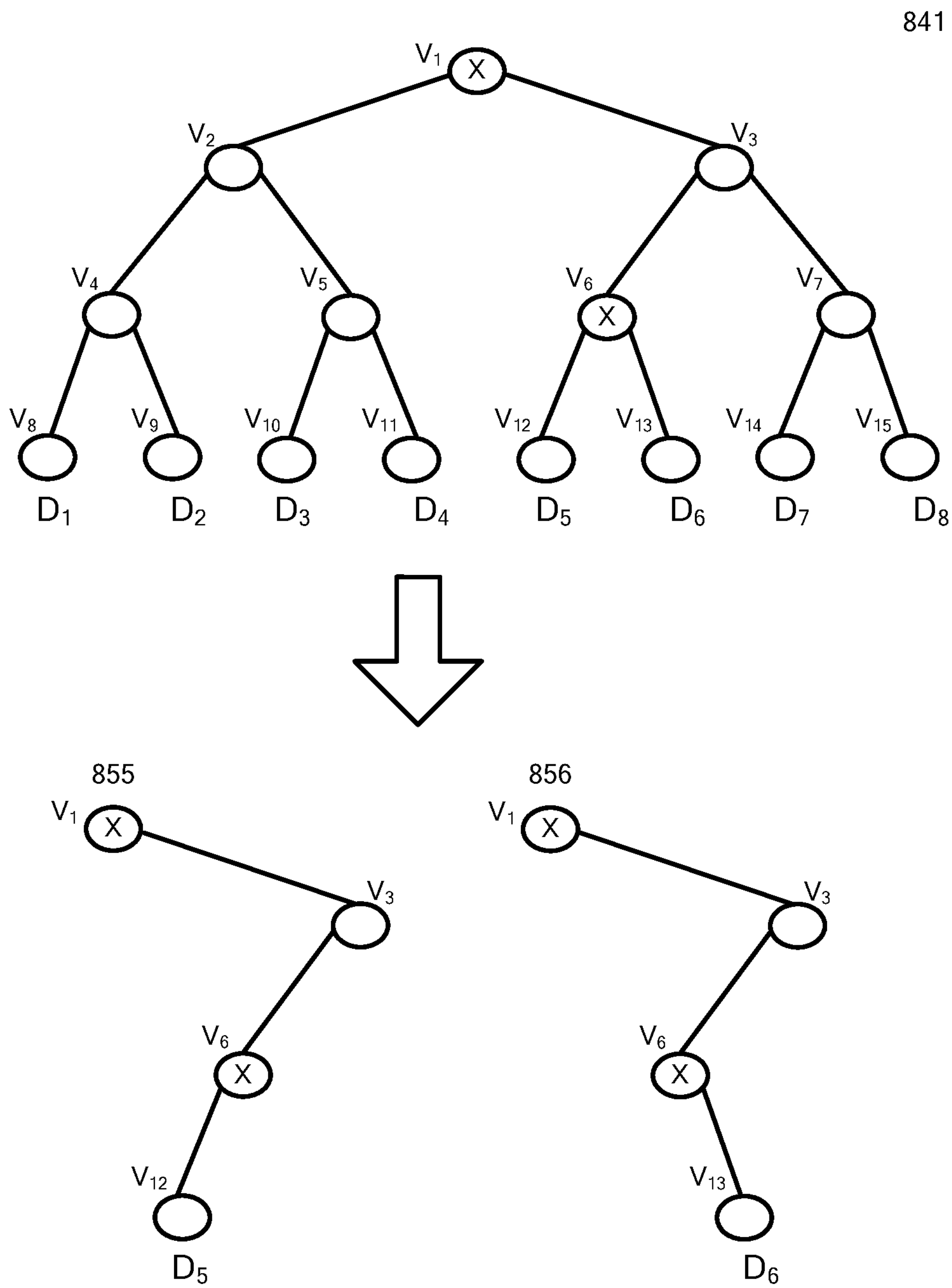

With reference now to FIGS. 8A and 8B, FIGS. 8A and 8B illustrate a case of not finding a key corresponding to a missing key in the set of keys stored in a fifth device (808). In this case, the local server (805) fails a supply of deficiency of a key in information on a set of keys stored in the fifth device (808).

Let us suppose that a set of keys for the fifth device (808) and a set of keys for the sixth device (809) are generated from a tree structure described in FIG. 8B, 841. The set of keys (855) for the fifth device (808) is represented as {K3 and K12} and, accordingly, has missing keys on the nodes $V_1$ and $V_6$. Further, the set of keys (856) for the sixth device (809) is represented as {K3 and K13} and, accordingly, has missing keys on the nodes $V_1$ and $V_6$.

In step 811, the local server (805) receives a set of the MKB and the encrypted content, E (Kc, C) from a service provider. The set, X, can be represented as X=[MKB, E (Kc, C)]. The MKB denotes E(Kdev', Kc) mentioned above. Let us suppose that MKB=E(Ki, Kc), i=6, where the content supplied for D5 and D6.

After receipt of the set, the local server (805) sends a hash key, Kh, to the fifth device (808).

In step 821, the fifth device (808) receives the hash key sent from the local server (805) and then calculates the hash value of the set of keys, {K3 and K12}, using the hash key. The hash value is represented as [H(Kh, Ki)], i=3, 12.

In step 812, the local server (805) stores the received hash value sent from the fifth device (808) as a second group together with the position of each key in the tree structure.

Similarly, the local server (805) sends the hash key, Kh, to the sixth device (809).

In step 831, the sixth device (809) receives the hash key sent from the local server (805) and then calculates the hash value of the set of keys, {K3 and K13}, using the hash key. The hash value is represented as [H(Kh, Ki)], i=3, 13.

In step 813, the local server (805) stores the received hash value sent from the sixth device (809) as the second group together with the position of each key in the tree structure.

The local server (805) performs the supply of a deficiency of a key in the set of stores in the fifth device (808). However, the one or more missing keys exist in the same positions, $V_1$ and $V_6$, in both sets of keys. Accordingly, a key in Kdev' is not found now.

Therefore, the local server (805) cannot supply deficiency of a key in the set of keys stored in the fifth device (808).

As a result of not finding a key in the Kdev', the local server (805) may send a hash value, [H(Kh, Ki)], i=3, 12, 13 and send the IDs of the fifth device (808) and the sixth device (809) to the key management system.

In response to receipt of the hash values and the IDs, the key management system may send encrypted missing keys to the devices via local server, and/or may not use the one or more missing keys to encrypt the content key for the devices with the IDs in the future.

Figure 9:
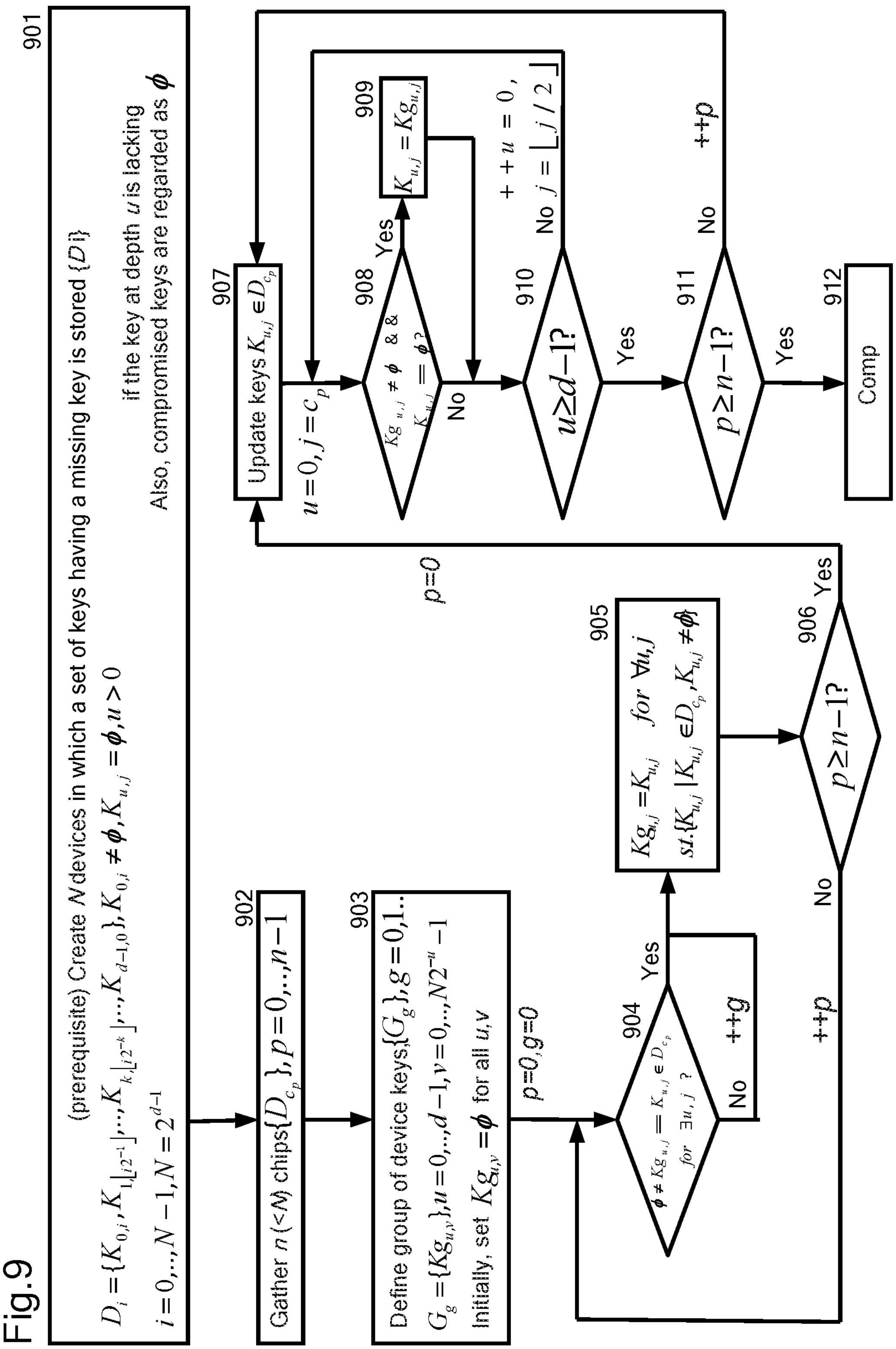
FIG. 9 illustrates an embodiment of a flowchart of a process for supplying deficiency of a key in information on a set of keys stored in a device when n sets of keys from n chips are gathered.

With reference now to FIG. 9, FIG. 9 illustrates an embodiment of a flowchart of a process for supplying deficiency of a key in information on a set of keys stored in a device when n sets of keys from n chips are gathered.

FIG. 9 illustrates the flowchart of the process in a case where the complete subtree method is used for generating a tree structure. In this case, a key in the set of keys are dropped or deleted in advance. But this can be applied also to the cases where a part of the set of keys may be dropped or deleted after storing the set of keys in the device.

The prerequisite is described in a box (901). In the prerequisite, Di denotes a set of keys stored in a device, K denotes a key in the set, $K_{m,n}$ denotes a key assigned to a node having depth m from a root node in a tree structure and having the position number n from the left on the common hierarchy in the tree structure. $\phi$ denotes an empty set.

The subject of the prerequisite is performed by a key management system.

The subject of steps 902 to 912 mentioned below may be a local server, a first device in which a set of keys having one or more missing keys is stored, or a second device in which a set of keys having a key corresponding to the missing key is stored.

Hereinafter, the subject of each step may be described as the local server, but the same are applied also to the subject of each of the first device and the second device.

In step 902, the local server gathers n sets of keys stored in n devices among the N devices. N denotes the number of all devices generated. n denotes the number of devices gathered and n<N. $\{D_{c_p}\}$ denotes the devices gathered. c_p denotes the number assigned to each of the gathered n devices.

In step 903, the local server defines a group, $\{G_g\}$ of a set of keys as a null group and then initially sets $Kg_{u,v}$ as an empty set, $\phi$, for all u and v. $G_g$ is defined as $Kg_{u,v}$, where u denotes the depth from a root node in the tree structure and v denotes the position number from the left on the common hierarchy in the tree structure. The local server sets p=0, g=0, to set that there is no group.

In one embodiment, there is no need to prepare for all 2N−1 key spaces, but just needs as many as gathered device keys and their nodes or depths.

In step 904, the local server judges whether a group registered has at least one of the keys D_c_p now has, as defined condition is satisfied or not. In one embodiment, these can be verified by using same hash functions in each chip, e.g. H(K,x), where x is a value of the key. If the judgment is positive, the local server proceeds to step 905. Meanwhile, if the judgment is negative, the local server increments g (i.e. generates a new group) and then proceeds to step 905.

In step 905, the local server registers the set of keys in D_c_p into the group.

In step 906, the local server judges whether the judgment of conditions defined in step 904 is made or not. If the judgment is positive, the local server proceeds to step 907. Meanwhile, if the judgment is negative, the local server increments p and then proceeds back to step 904.

From step 907, the local server supplies keys for missing keys if they are found in each group.

In step 908, the local server judges whether one or more missing keys exists in the set of keys belonging to the group or not. If the judgment is positive, the local server proceeds to step 909. Meanwhile, if the judgment is negative, the local server proceeds to step 900.

In step 909, the local server sets $K_{u,j}=Kg_{u,j}$.

In step 910, the local server judges whether the judgment of conditions defined in step 908 is made. If the judgment is positive, the local server proceeds to step 911. Meanwhile, if the judgment is negative, the local server ascends the device number c_p and then proceeds back to step 908.

In step 911, the local server judges whether the judgment of conditions defined in step 911 is made or not. If the judgment is positive, the local server proceeds to a final step 912. Meanwhile, if the judgment is negative, the local server increments p and then proceeds back to step 907.

In step 912, the local server terminates the supply of a deficiency of keys.

Figure 10A:
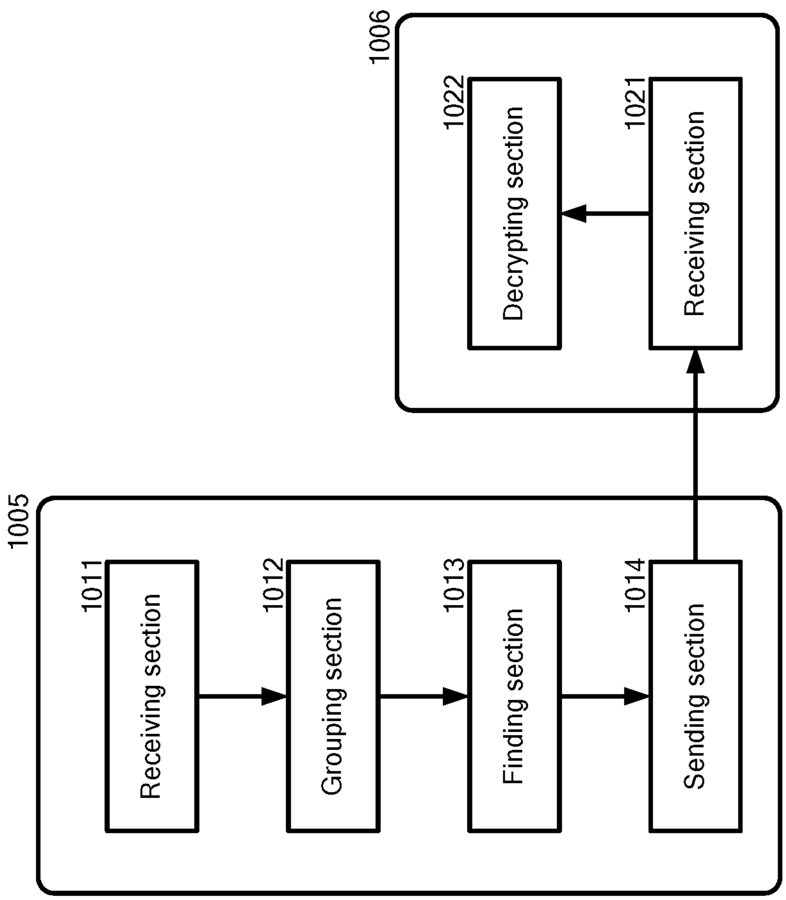
FIG. 10A illustrates an embodiment of an overall functional block diagram of a system hardware used in accordance with one embodiment of the flowcharts described in FIG. 3 and FIGS. 4A to 4C.

With reference now to FIG. 10A, FIG. 10A illustrates an embodiment of an overall functional block diagram of a system hardware used in accordance with one embodiment of the flowcharts described in FIG. 3 and FIGS. 4A to 4C.

FIG. 10A illustrates a local server (1005), and a first device (1006) in which information on a set of keys having one or more missing keys is stored.

The local server (1005) may comprise a receiving section (1011), a grouping section (1012), a finding section (1013) and a sending section (1014).

The receiving section (1011) receives information on a set of keys from each of a plurality of devices. The information on set of keys may comprise a plurality of key values. The plurality of key values may be secured, such as hash values with a common hash key. Each key in the set of keys may be assigned to a node among nodes in a tree structure or may be assigned to a pair of nodes among nodes in one or more tree structures. Each key in the plurality of keys may be assigned to a node. Further, the set of keys may have one or more missing keys.

The grouping section (1012) groups the first device (1006) and the second device (not shown) together in a case where a position of a key or each key in the tree structure in a first set of keys stored in a first device (1006) among the plurality of devices and a value of this key correspond to a position of a key or each key in the tree structure in a second set of keys stored in a second device among the plurality of devices and a value of this key, respectively.

The finding section (1013) finds a key corresponding to the missing key from the information on the second set of keys or finding a key common in the first set of keys and the second set of keys, in a case where there are one or more missing keys in the first set of keys.

The sending section (1014) sends the encrypted found key securely from the local server (1005) to the first device (1006). One embodiment of sending the found key securely from the local server (1005) to the first device (1006) is to encrypt the found key, using a common key between the first device (1006) and second device (not shown).

The first device (1006) may comprise a receiving section (1021) and a decrypting section (1022).

The receiving section (1021) receives information on the set of keys from the second device (not shown).

The receiving section (1021) receives the encrypted found key from the local server (1005). In a case where the found key is encrypted, the encrypted found key is decrypted using the common key.

The decrypting section (1022) decrypts the encrypted content using the found key.

Figure 10B:
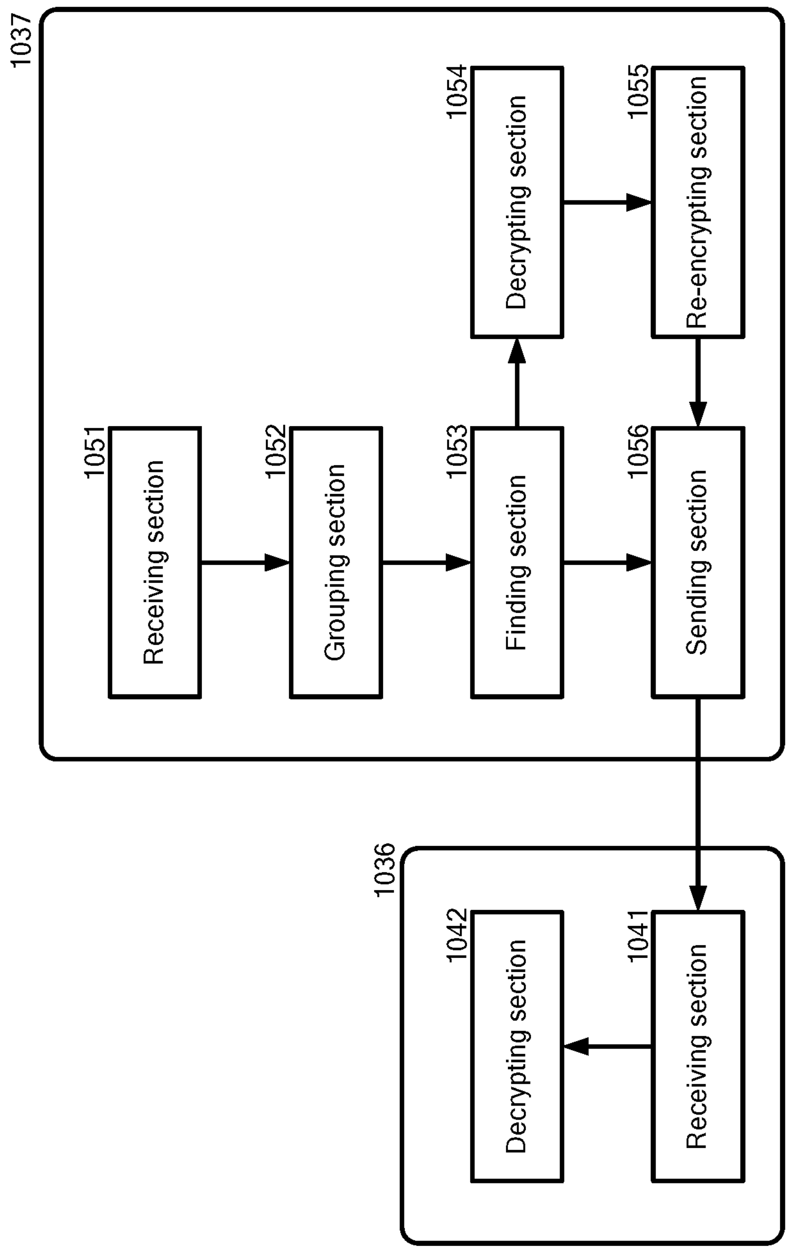
FIG. 10B illustrates an embodiment of an overall functional block diagram of a system hardware used in accordance with one embodiment of the flowcharts described in FIG. 5 and FIG. 6.

With reference now to FIG. 10B, FIG. 10B illustrates an embodiment of an overall functional block diagram of a system hardware used in accordance with one embodiment of the flowcharts described in FIG. 5 and FIG. 6A to 6C.

FIG. 10B illustrates a first device (1036) in which information on a set of keys having one or more missing keys is stored and a second device (1037) in which a key corresponding to the missing key is stored.

The first device (1036) may comprise a receiving section (1041) and a decrypting section (1042).

The receiving section (1041) may receive the re-encrypted content from the second device (1037) in a case where the re-encrypted content is generated in the second device (1037) and sent it from the second device (1037).

The receiving section (1041) may receive the encrypted found key from the second device (1037) in a case where the corresponding key is found in the second device (1037) and sent it from the second device (1037).

The decrypting section (1042) may decrypt the re-encrypted content using the key common in the first set of keys and the second set of keys in a case where the re-encrypted content is sent from the second device (1037).

The decrypting section (1042) may decrypt the encrypted content using the found key in a case where the encrypted content is sent from the second device (1037).

The second device (1037) may comprise a receiving section (1051), a grouping section (1052), a finding section (1053), a decrypting section (1054), a re-encrypting section (1055) and a sending section (1056).

The receiving section (1051) receives information on a set of keys from each of a plurality of devices including the first device (1036).

The grouping section (1052) groups the first device (1036) and the second device (1037) together in a case where a position of a key or each key in the tree structure in a first set of keys stored in the first device (1036) among the plurality of devices and a hashed value of this key correspond to a position of a key or each key in the tree structure in a second set of keys stored in the second device (1037) among the plurality of devices and a hashed value of this key, respectively.

The finding section (1053) finds a key corresponding to the missing key from the second set of keys.

The decrypting section (1054) may decrypt an encrypted content key using a key in the second set of keys, wherein the content key is used for encrypting a content in a case where the re-encrypted content is generated in the second device (1037).

The decrypting section (1054) may decrypt an encrypted content using the found key in a case where the corresponding key is found in the second device (1037).

The re-encrypting section (1055) may re-encrypt the decrypted content key using a key common in the first set of keys and the second set of keys in a case where the re-encrypted content is generated in the second device (1037).

The re-encrypting section (1055) may re-encrypt the decrypted content using a key common in the first set of keys and the second set of keys in a case where the corresponding key is found in the second device (1037).

The sending section (1056) may send information on the set of keys to the first device (1036) directly or via a local server (not shown).

The sending section (1056) may send the re-encrypted content key to the first device (1036) directly or via a local server in a case where the re-encrypted content is generated in the second device (1037).

The sending section (1056) may send the encrypted found key from the second device to the first device directly or via a local server in a case where the corresponding key is found in the second device (1037).

The followings are simulation results of gathering the set of keys obtained from a plurality of devices.

Let us suppose that the total number of devices=N, the number of the set of keys obtained from the devices locally gathered=n, the ratio of non-missing device keys in each device=p_b (i.e., =(the number of keys in each device)/(log N+1)), the ratio of device keys including those regarded to be owned by complementation=p_a. p_a is simulated by randomly selecting positions of one or more missing keys, except for leaf keys, creating 100 virtual devices, and then calculating their average.

Compared the result with two cases by the ratio of missing keys in a device as {A=1: equally lacking regardless of the depth of the tree structure, A=2: increasing the probability of missing keys in proportional to sqrt(d), where d is the distance from the leaf node (d=1: leaf, d=log N+1: root).

According to the simulation results, there is a probability that devices in which the set of keys has one or more missing keys cannot be authenticated forever unless an embodiment of the present invention is used for the authentication of the device. However, by applying an embodiment of the present invention, in a case where the number of chance of gathering the set of keys obtained from the devices is m times, the probability to be authenticated at least one time, p_m, is $p_m=1-(1-p_a)^m$, and the average time of gathering the set of keys obtained from the devices until authenticated, m_ave is, $$m_{ave} = p_a \sum_{k=1}^{\infty} k(1-p_a)^{k-1} = p_a^{-1}.$$

Accordingly, even if p_a=0.5, it can be authenticated in two times, m_ave=2, on an average according to an embodiment of the present invention.

Accordingly, it is possible to authenticate the device even if one or more keys in a set of the device lacks at the time when the device is manufactured or after manufacturing of the device.

Therefore, improvement of robustness, fault tolerance or availability of a mass of devices can be achieved according to an embodiment of the present invention.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information on the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

What is claimed is:

1. A device, comprising:

a processor; and a memory storing a program, which, when executed on the processor, performs an operation for supplying deficiency of a key in information on a set of keys stored in a device, the operation comprising;

receiving the information on a set of keys from each of a plurality of devices, wherein the information on the set of keys includes a plurality of key values, each key in the set of keys being assigned to at least one node among nodes in a tree structure, and the set of keys having one or more missing keys;

in a case where a position of a key or each key in the tree structure in a first set of keys stored in a first device among the plurality of devices and a value of this key correspond to a position of a key or each key in the tree structure in a second set of keys stored in a second device among the plurality of devices and a value of this key, respectively, grouping the first device and the second device together; and in a case where there is a missing key in the first set of keys, finding a key corresponding to the missing key from the second set of keys or finding a key common in the first set of keys and the second set of keys.

2. A computer program product for supplying deficiency of a key in information on a set of keys stored in a device, the computer program product comprising a computer readable storage medium having program instructions embodied therewith, wherein the computer readable storage medium is not a transitory signal per se, the program instructions executable by a device to cause the device to perform a method comprising:

receiving the information on a set of keys from each of a plurality of devices, wherein the information on the set of keys includes a plurality of key values, each key in the set of keys being assigned to at least one node among nodes in a tree structure, and the set of keys having one or more missing keys;

in a case where a position of a key or each key in the tree structure in a first set of keys stored in a first device among the plurality of devices and a value of this key correspond to a position of a key or each key in the tree structure in a second set of keys stored in a second device among the plurality of devices and a value of this key, respectively, grouping the first device and the second device together; and in a case where there is a missing key in the first set of keys, finding a key corresponding to the missing key from the second set of keys or finding a key common to the first set of keys and the second set of keys.

* * * * *